(12) United States Patent
Dischinger et al.

(10) Patent No.: US 10,716,646 B2
(45) Date of Patent: Jul. 21, 2020

(54) METHOD AND APPARATUS FOR TREATING MALOCCLUSIONS AND TEETH ALIGNMENT

(71) Applicants: Terry G. Dischinger, Lake Oswego, OR (US); William M. Dischinger, Lake Oswego, OR (US); Steven O. Luse, Vista, CA (US)

(72) Inventors: Terry G. Dischinger, Lake Oswego, OR (US); William M. Dischinger, Lake Oswego, OR (US); Steven O. Luse, Vista, CA (US)

( * ) Notice: Subject to any disclaimer, the term of this patent is extended or adjusted under 35 U.S.C. 154(b) by 656 days.

(21) Appl. No.: 15/410,350

(22) Filed: Jan. 19, 2017

(65) Prior Publication Data

US 2017/0128170 A1 May 11, 2017

Related U.S. Application Data

(63) Continuation-in-part of application No. 14/552,352, filed on Nov. 24, 2014, now abandoned, which is a continuation-in-part of application No. 14/209,685, filed on Mar. 13, 2014, now abandoned.

(51) Int. Cl.
*A61C 7/36* (2006.01)
*A61C 7/12* (2006.01)

(52) U.S. Cl.
CPC . *A61C 7/36* (2013.01); *A61C 7/12* (2013.01)

(58) Field of Classification Search
CPC .................................. A61C 7/36; A61C 7/00
USPC ............................................................ 433/19
See application file for complete search history.

(56) References Cited

U.S. PATENT DOCUMENTS

| | | | |
|---|---|---|---|
| 3,798,773 | A | 3/1974 | Northcutt |
| 4,671,767 | A | 6/1987 | Blechman et al. |
| 5,678,990 | A | 10/1997 | Rosenberg |
| 5,829,975 | A | 11/1998 | Gold |

(Continued)

FOREIGN PATENT DOCUMENTS

WO 2013096090 6/2013

OTHER PUBLICATIONS

Notification of Transmittal of the International Search Report and the Written Opinion of the International Searching Authority, or the Declaration, dated May 15, 2018, PCT/US18/13834.

(Continued)

*Primary Examiner* — Cris L. Rodriguez
*Assistant Examiner* — Mirayda A Aponte
(74) *Attorney, Agent, or Firm* — Randall Danskin P.S.

(57) ABSTRACT

An orthodontic appliance is disclosed and which cooperates with both the upper and lower dental arches of a patient and which includes an archwire coupler which is attached to individual archwires that are releasably attached to the anterior facing surface of a patient's teeth requiring orthodontic treatment; and a multiple section elongated telescoping assembly which is rotatably and releasably coupled to the archwires attached to the upper and lower dental arches of a patient undergoing treatment, and wherein the multiple section elongated telescoping assembly effects movement of the upper dental arch in a rearward direction, and the lower dental arch in a forward direction when the multiple section elongated telescoping assembly is in a given position along a predetermined course of travel.

8 Claims, 10 Drawing Sheets

(56) References Cited

U.S. PATENT DOCUMENTS

| | | |
|---|---|---|
| 6,669,474 B2 | 12/2003 | Vogt |
| 7,578,671 B2 | 8/2009 | Corcoran et al. |
| 2006/0234180 A1 | 10/2006 | Huge et al. |
| 2007/0020577 A1* | 1/2007 | Corcoran ................. A61C 7/36 433/19 |
| 2013/0177861 A1 | 7/2013 | Hayes |
| 2014/0255866 A1* | 9/2014 | Faust ....................... A61C 7/36 433/19 |
| 2014/0272759 A1 | 9/2014 | Dischinger |

OTHER PUBLICATIONS

Written opinion of the International Searching Authority, PCT/US15/57612, dated Jan. 19, 2016.
Notification concerning transmittal of the international preliminary report on patentability, PCT/US15/57612, dated Jun. 8, 2017.
Notification of Transmittal of International Search Report dated Aug. 8, 2014 for PCT/US2014/028466; Applicant: Terry Dischinger.

\* cited by examiner

METHOD AND APPARATUS FOR TREATING MALOCCLUSIONS AND TEETH ALIGNMENT

TECHNICAL FIELD

The present invention relates to a method and apparatus for treating malocclusions and teeth alignment, and more specifically to a method and apparatus which facilitates the simultaneous movement of malpositioned teeth along the upper and lower dental arches of a patient undergoing orthodontic treatment while simultaneously allowing the movement of the upper and lower dental arches, one relative to the other.

BACKGROUND OF THE INVENTION

Orthodontic treatment involves the movement of malpositioned teeth to an orthodontically correct position. During treatment, a clinician may use various known orthodontic treatment regimens to effect the proper movement of malpositioned teeth into appropriate orientations relative to adjacent teeth, or which further may move the dental arches of a patient in various directions in order to provide an appropriate bite.

Typically during some well-known orthodontic treatment regimens, clinicians have utilized various types of orthodontic brackets which have been adhesively or otherwise releasably secured to the anterior facing surface of a malpositioned tooth, and which further then may be engaged by, or cooperate with, a suitable archwire which then imparts force to the malpositioned tooth so as to cause first, second and/or third order movement to the malpositioned tooth thereby causing the malpositioned tooth to be eventually located in an appropriate orientation relative to adjacent teeth. In order to effect movement of the malpositioned teeth in the upper and lower dental arches of a patient undergoing treatment, the archwire employed in a given orthodontic treatment regimen passes through, or otherwise cooperates with each of the orthodontic brackets which are releasably affixed to the anterior facing surface of the malpositioned tooth, and the distal ends of each of the archwires which are located along the upper and lower dental arches of the patient are typically secured to a patient's rear molars by means of a buccal tube or the like.

As noted, above, the orthodontic treatment of some patients may include correcting the alignment or position of the upper dental arch or maxillary jaw, with a lower dental arch or mandible jaw. For example, certain patients have a condition referred to as a Class II malocclusion, or which is commonly referred to as an "overbite" and where the lower dental arch is located an excessive distance in a rearward direction relative to the location of the upper dental arch when the jaws are in a closed position. A number of approaches have been developed to treat Class II malocclusions. One of the most common approaches for treating a Class II malocclusion is to use an intra-oral orthodontic appliance known as a "Herbst" device. A conventional Herbst device is comprised of a sleeve and tube assembly. Typically one component of the aforementioned assembly is pivotally secured to a molar tooth in the upper arch, while another component is pivotally secured to a bicuspid or anterior tooth of the lower dental arch, or a cantilever arm in the lower arch. Often times the sleeve in the two components are pivotally secured to an archwire, bracket, cap, or other orthodontic appliance on a particular tooth. Such a Herbst device is shown in U.S. Pat. No. 3,798,773. While Herbst devices have operated with some degree of success, shortcomings are attendant with their use. For example, such prior art devices operate by forcing the lower jaw into the clinically desired position notwithstanding whether the patient's jaw is open or closed. In other words, the Herbst device is operable during all positions of movement of the jaw of the patient. Consequently, the patient must learn, over time, and with some early discomfort, how to position their jaw in an appropriate forward location so as to permit the "Herbst" device to operate effectively. Eventually the patient experiences a muscular response such that the patient's jaws begin to naturally close with the proper clinical orientation.

Herbst devices have been undesirable from a patient's standpoint because they are typically designed to have long and stiff assemblies, and are further positioned in the mouth such that these devices can typically be easily viewed by others during a patient's treatment. Additionally, these same devices often create discomfort near the front of the mouth. Other patient discomforts such as irritation are also sometimes reported. In addition to the earlier mentioned shortcomings, anterior teeth have a tendency to adversely flare or tip forward when they are connected to a Herbst device. While conventional Herbst devices may sometimes be used to correct a malocclusion at the same time that archwires and brackets are used, so as to prevent the aforementioned tipping, there are significant challenges in doing so. More specifically, when the Herbst device extends from a molar on the upper dental arch to a bicuspid tooth on the lower dental arch, the device and tube assembly of the Herbst assembly may obstruct access to a large number of teeth. This resulting obstruction makes it extremely difficult for practitioners to properly affix conventional orthodontic brackets to the anterior facing surfaces of teeth requiring treatment. Various ad hoc approaches by various practitioners have been attempted to address this problem, however, none of them have provided a suitable solution. Further, it has often become necessary, after using a Herbst device to correct or straighten teeth that have been affected by the use of the Herbst device. This, of course, increases the overall treatment time and cost borne by the patient.

While there have been several attempts at making improved Herbst appliances such as what is disclosed in U.S. Pat. Nos. 4,382,783; 5,645,424; 5,848,891; and 5,980,247, none of these prior art teachings were designed to move teeth at the same time as providing jawbone realignment. Other patents have disclosed techniques for correcting jawbone alignment for Class II malocclusions. However, these devices have not always been successful in both correcting the Class II malocclusion, and simultaneously allowing teeth to be straightened during the same treatment interval. Often it has been found that the malocclusion correction is completely satisfactory, but the movement of the teeth has not been completed. Therefore, unwanted additional orthodontic correction and thus additional time and expense must be undertaken to achieve the clinically desired result.

Therefore, clinicians have long desired to have a new and improved orthodontic appliance, and method, for completing both orthodontic regimens simultaneously, and effectively within the same treatment interval which has been set aside to perform the Class II correction for malocclusions. Such an appliance should be very comfortable to use, relatively inexpensive to manufacture, and further be aesthetically appealing to the patient.

SUMMARY OF THE INVENTION

A first aspect of the present invention relates to a pair of archwires each having a longitudinal axis, and which are individually releasably attached to a multiplicity of teeth forming a lower and upper dental arch of a patient, and wherein the lower and upper dental arches form an occlusal plane when the respective dental arches are closed; an archwire coupler which is individually attached to each of the respective archwires; a multiple section, elongated, telescoping assembly having opposite proximal and distal ends, and wherein the proximal end is rotatably attached to the archwire coupler which is affixed to the archwire installed on the upper dental arch of the patient, and wherein the distal end of the telescoping assembly is rotatably affixed to the archwire coupler which is affixed on the archwire installed on the lower dental arch of the patient, and wherein at least one of the telescoping sections defines an internal cavity, and wherein the multiple section, elongated, telescoping assembly is moveable along a coaxial course of travel from a first, extended position, where the respective sections of the telescoping assembly are oriented longitudinally, outwardly, one relative to the other, and the telescoping assembly has a maximum length dimension as measured between the proximal and distal ends, and is further oriented in a non-parallel orientation relative to the occlusal plane, to a second, retracted position, and wherein in the second, retracted position the respective sections forming the telescoping assembly are substantially, internally telescoped together, and the telescoping assembly has a minimum, length dimension as measured between the proximal and distal ends, and is further located in a substantially parallel orientation relative to the occlusal plane; and a biasing spring is received, at least in part, within the internal cavity of at least one of the telescoping sections of the multiple section, elongated, telescoping assembly, and wherein a biasing force exerted by the spring is applied to the multiple section, elongated, telescoping assembly only when the multiple section, elongated telescoping assembly is moving along the course of travel, and is closely adjacent to, or at the second, retracted position along the course of travel, and wherein the biasing force of the spring is transmitted by the respective telescoping sections forming the multiple section, elongated telescoping assembly in a direction which is substantially along the longitudinal axis of each archwire, and along the occlusal plane to simultaneously effect movement of the upper arch of the patient in a rearward direction, and the lower arch in a forward direction, while not simultaneously imparting adverse movement to the respective teeth forming each of the dental arches of the patient.

Another aspect of the present invention relates to an orthodontic appliance which includes, a pair of archwires each having a longitudinal axis, and which are individually releasably attached to a multiplicity of teeth, and which further, collectively, form the respective upper and lower dental arches of a patient undergoing orthodontic treatment; a pair of archwire couplers which are individually releasably attached to each of the respective archwires, and which further defines an internal cavity; a pair of fasteners which individually releasably cooperate with each archwire coupler, and which further forcibly engage one of the archwires within the internal cavity of the respective archwire couplers; an outer, cylindrically shaped tube having opposite first and second ends, and which further defines an internal cavity which extends between the first and second ends thereof; a first attachment member defining an aperture, and which is made integral with the outer, cylindrically shaped tube, and wherein one of fasteners passes through the aperture, and the first attachment member rotates freely about the fastener; a first, intermediate tube which has opposite first and second ends, and an internal cavity which extends between the first and second ends thereof, and which further is telescopingly received within the internal cavity which is defined by the outer, cylindrically shaped tube, and is further reciprocally moveable relative thereto; a second, intermediate tube which has opposite first and second ends, and an internal cavity extending between the first and second ends thereof, and which further is telescopingly received within the internal cavity of the first, intermediate tube, and is reciprocally moveable relative thereto; an inner, elongated rod which has opposite first and second ends, and which is telescopingly received within the internal cavity of the second, intermediate tube, and is reciprocally moveable relative thereto; a second attachment member defining an aperture, and which is affixed to the second end of the inner elongated rod, and wherein another of the fasteners passes through the aperture which is defined by the second attachment member, and the second attachment member further freely rotates about the fastener, and wherein the first and second attachment members are individually rotatably affixed to one of the pair of archwires by way of the respective archwire couplers, and individual cooperating fasteners; and a compression spring which is received, at least in part, within the internal cavity which is defined by the outer, cylindrically shaped tube, and wherein a movement of the lower dental arch from an open position, where the lower dental arch is spaced from the upper dental arch, to a closed position, and where the lower dental arch is located in a closely adjacent orientation relative to the upper dental arch, and which defines an occlusal plane, is effective in imparting telescoping, reciprocal movement to the respective inner elongated rod, and first and second intermediate tubes relative to the outer, cylindrically shaped tube, along a course of travel from a first, extended position, where the inner elongated rod, and first and second intermediate tubes are located longitudinally, outwardly relative to the outer, cylindrically shaped tube, and in a distally displaced orientation; and to a second, retracted position, and where the inner elongated rod, and first and second cylindrically shaped tubes are substantially telescopingly received, and enclosed within the internal cavity as defined by the outer, cylindrically shaped tube, and wherein at least a portion of this telescoping, reciprocal motion between the first and second positions is effected without a biasing force being imparted by the compression spring to cause the telescoping, reciprocal movement between the first, extended position, and the second, retracted position, and wherein the biasing force of the compression spring effects the movement of the upper and lower dental arches, in opposite directions, one relative to the other, only when the elongated rod, and the first and second cylindrically shaped tubes are located substantially in the second retracted position.

Another aspect of the present invention relates to a method for moving a lower dental arch relative to an upper dental arch while simultaneously moving malpositioned teeth relative to each of the upper and lower dental arches and which includes a first step of providing a pair of archwires each having a longitudinal axis, and which are individually releasably attached to a multiplicity of teeth forming a lower and upper dental arch of a patient, and wherein the lower and upper dental arches form an occlusal plane when the respective dental arches are closed; attaching an archwire coupler to each of the respective archwires after an initiation of orthodontic treatment, and without detaching the archwires from the teeth receiving orthodontic treatment; providing a multiple section, elongated, telescoping assembly having opposite first and second ends, and rotatably attaching the first end of the telescoping assembly to the archwire coupler which is affixed to the archwire installed on the upper dental arch of the patient, and further rotatably affixing the second end of the telescoping assembly to the archwire coupler which is affixed on the lower dental arch of the patient, and wherein at least one of the telescoping sections defines an internal cavity; moving the multiple section, elongated, telescoping assembly along a coaxial course of travel from a first, extended position, and where the respective sections of the telescoping assembly are oriented longitudinally, outwardly, one relative to the other, and the telescoping assembly has a maximum length dimension as measured between the first and second ends, and is further oriented in a non-parallel relationship relative to the occlusal plane; to a second, retracted position, and wherein in the second, retracted position, the respective sections forming the telescoping assembly are substantially, internally telescoped together, and the telescoping assembly has a minimum, length dimension as measured between the first and second ends, and is further located in a substantially parallel relationship relative to the occlusal plane; and positioning a biasing spring, at least in part, within the internal cavity of at least one of the telescoping sections of the multiple section, elongated, telescoping assembly, and selectively exerting a biasing force with the biasing spring to the multiple section, elongated, telescoping assembly only when the multiple section, elongated telescoping assembly is moving along the course of travel, and is closely adjacent to, or at the second retracted position along the course of travel, and wherein the biasing force exerted by the biasing spring is transmitted by the respective telescoping sections forming the multiple section, elongated telescoping assembly in a direction which is substantially along the longitudinal axis of each of the archwires, and along the occlusal plane, so as to simultaneously effect movement of the upper dental arch of the patient in a rearward direction, and the lower dental arch in a forward direction, while not simultaneously imparting adverse movement to the respective teeth forming each of the dental arches of the patient.

Still further another aspect of the present invention relates to a method for moving a lower dental arch relative to an upper dental arch while simultaneously moving malpositioned teeth relative to the upper and lower dental arches, and which includes a first step of releasably attaching individual archwires to a multiplicity of teeth which form the respective upper and lower dental arches of the patient, and initiating movement of the malpositioned teeth with the respective archwires; after the step of releasably attaching the individual archwires the method further comprises providing a first and second archwire coupler, each having an internal cavity, and placing the respective archwires within the internal cavity of each of the first and second archwire couplers without releasably attaching the individual archwires from the upper and lower dental arches of a patient undergoing orthodontic treatment; providing first and second fasteners which individually, releasably cooperate with the first and second archwire coupler, and orienting the respective fasteners so that each of the fasteners forcibly engages the archwire within the internal cavity of the respective first and second archwire couplers; attaching the first archwire coupler in a predetermined position on the archwire which is located on the upper dental arch of the patient, and a second archwire coupler in a predetermined position on the archwire which is locate on the lower dental arch of the patient; providing an outer, cylindrically shaped tube having opposite, first and second ends, and which further defines an internal cavity which extends between the first and second ends thereof; providing a first attachment member defining an aperture, and which is made integral with the outer, cylindrically shaped tube, and passing the first fastener through the aperture which is defined by the first attachment member, and rendering the first attachment member, and the outer, cylindrically shaped tube freely rotatable about the first fastener and the first archwire coupler; providing a first, intermediate tube which has opposite, first and second ends, and an internal cavity which extends between the first and second ends thereof, and telescopingly positioning the first intermediate tube within the internal cavity defined by the outer, cylindrically shaped tube; providing a second, intermediate tube which has opposite, first and second ends, and an internal cavity extending between the first and second ends thereof, and telescopingly positioning the second, intermediate tube within the internal cavity of the first, intermediate tube; providing an inner, elongated rod which has opposite, first and second ends, and telescopingly positioning the inner, elongated rod within the internal cavity of the second, intermediate tube; providing a second attachment member defining an aperture, and affixing the second attachment member to the second end of the inner elongated rod, and passing the second fastener through the aperture which is defined by the second attachment member, and wherein the second fastener cooperates with the second archwire coupler which is affixed to the archwire, and which is located along the lower dental arch of the patient, and wherein the second fastener renders the second attachment member, and the inner, elongated rod freely rotatable about the second fastener; providing a compression spring and orienting the compression spring, at least in part within the internal cavity of the outer, cylindrically shaped tube; and moving the lower dental arch from an open position, where the lower dental arch is spaced, and in a non-parallel relationship relative to the upper dental arch, to a closed position, and where the lower dental arch is located in a closely adjacent, and substantially parallel orientation relative to the upper dental arch, and along an occlusal plane, and wherein the movement of the lower dental arch, by the patient, from the open position to the closed position is effective in imparting telescoping, reciprocal movement, along a course of travel, to the respective inner elongated rod, and first and second intermediate tubes relative to the outer, cylindrically shaped tube, from a first, extended position, and where the inner elongated rod, and first and second intermediate tubes are extended longitudinally outwardly relative to the outer, cylindrically shaped tube, and in a distally displaced orientation relative to the outer, cylindrically shaped tube; and to a second, retracted position, and where the inner elongated rod, and first and second cylindrically shaped tubes are substantially telescopingly received, and enclosed within, the internal cavity which is defined by the outer, cylindrically shaped tube, and wherein a preponderance of the telescoping, reciprocal motion of the inner, elongated rod, and first and second intermediate tubes relative to the outer, cylindrically shaped tube, and between the first extended position, and the second, retracted position is caused without a biasing force being imparted by the compression spring to effect the telescoping, reciprocal movement, and wherein the biasing force exerted by the compression spring is effective, when the dental arches of the patient are in a closed position, to move the upper dental arch in a rearward direction while simultaneously causing the lower arch to move in a forward direction, and without simultaneously interfering with the movement of the malpostioned teeth in the upper and lower dental arches and which is caused by the presence of the upper and lower archwires.

Other aspects of the present invention will be discussed in greater detail hereinafter.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
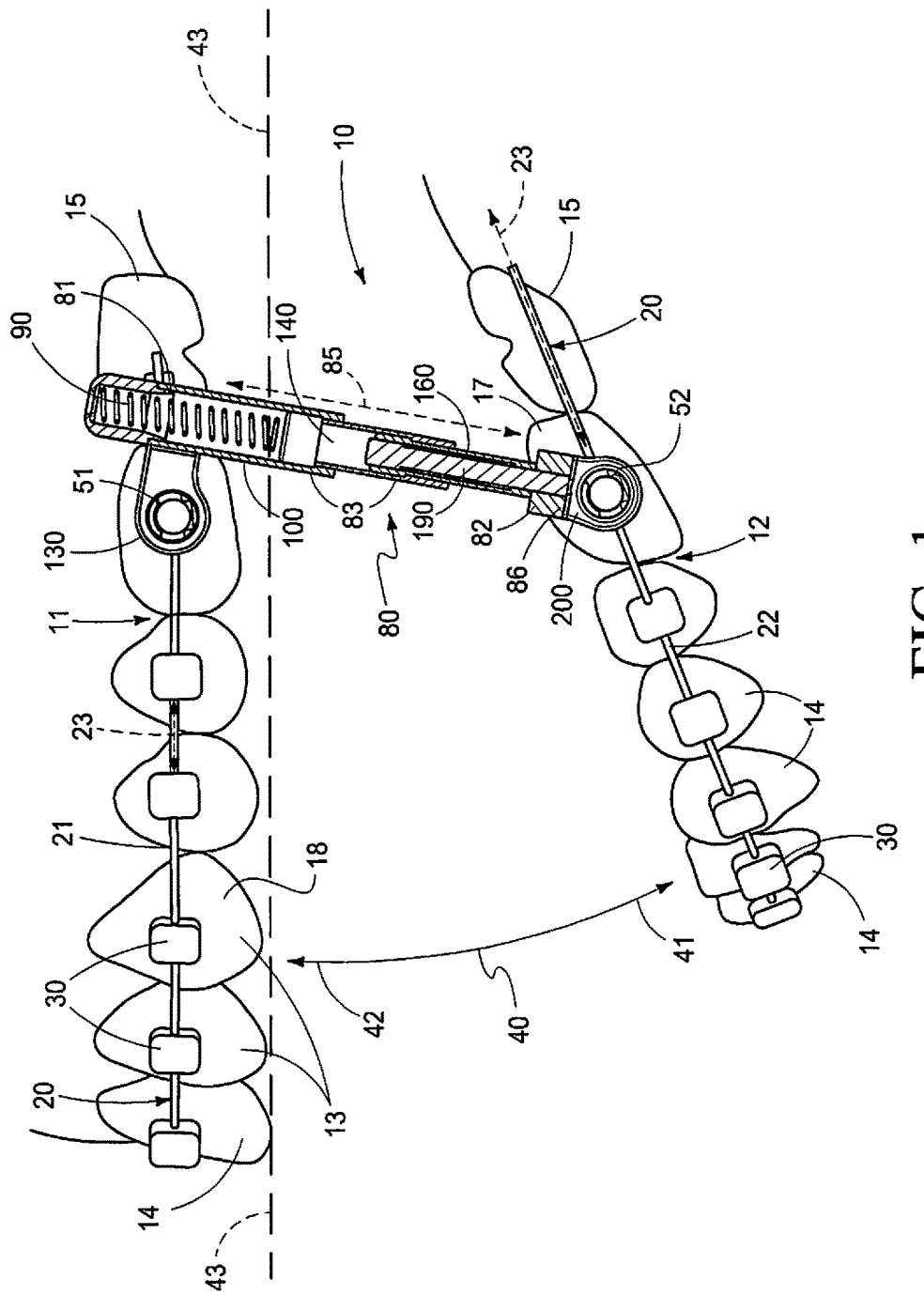
FIG. 1 is somewhat simplified, environmental, longitudinal sectional view of the present invention as would be seen when it is installed in the mouth of a patient and is further cooperating with an archwire placed on the upper and lower dental arches of a patient. The invention as shown is displayed in a first position.

Turning now to the drawings which are referenced, above, the apparatus of the present invention is generally indicated by the numeral 10 in FIG. 1, and following. The invention comprises an orthodontic appliance 10 which cooperates with both the upper and lower dental arches, and which are generally indicated by the numerals 11, and 12, of a patient so as to achieve the objectives of a predetermined orthodontic treatment regimen. The upper and lower dental arches 11 and 12 are formed of a multiplicity of teeth 13, some of which are malpositioned, one relative to the others, and which are further variously located within the upper and lower dental arches. The upper and lower dental arches 11 and 12 have a forward portion or region 14, and an opposite rearward portion or region 15. Still further the orthodontic appliance or apparatus 10 is typically attached to, or located between the second bicuspid and the first molar on the upper dental arch 11, and the first and second bicuspid on the lower dental arch 12. It should be understood that the present invention is located well back in the oral cavity of the patient, and therefore cannot typically be seen by a casual observer. This is a particularly novel feature inasmuch as many of the prior art devices are attached in a more forward location in the mouth and can be readily seen. This is one of several severe drawbacks to using the prior art devices from a patient's perspective.

As should be understood, the orthodontic appliance 10 is operable to work or operate in combination with individual archwires 20. The respective archwires include a first and second archwire 21 and 22 (FIG. 1), and which are individually positioned along the upper dental arch 11, and lower dental arch 12, respectively. The first and second archwires are of traditional design. Each of the first and second archwires 21 and 22 have a longitudinal axis 23 which extends along the length dimension of each of the respective archwires. The respective first and second archwires 21 and 22 are fabricated in a manner so that they may each cooperate with individual orthodontic brackets 30, of traditional design, and which are typically adhesively secured to the anterior facing surface 18 of malpositioned teeth 13, and which form the upper and lower dental arches 11 and 12, respectively. The individual orthodontic brackets 30 define, at least in part, an archwire slot 31 (FIG. 6) for receiving, and then cooperating with the respective first and second archwires 21 and 22. Once the individual archwires are received within the respective orthodontic brackets 30, the archwires cooperate with each of the orthodontic brackets, so as to effect first, second and/or third order movement, and cause the malpositioned teeth 13, in either the upper or lower dental arches 11 and 12, to be appropriately positioned relative to adjacent teeth in the same dental arch.

Figure 2:
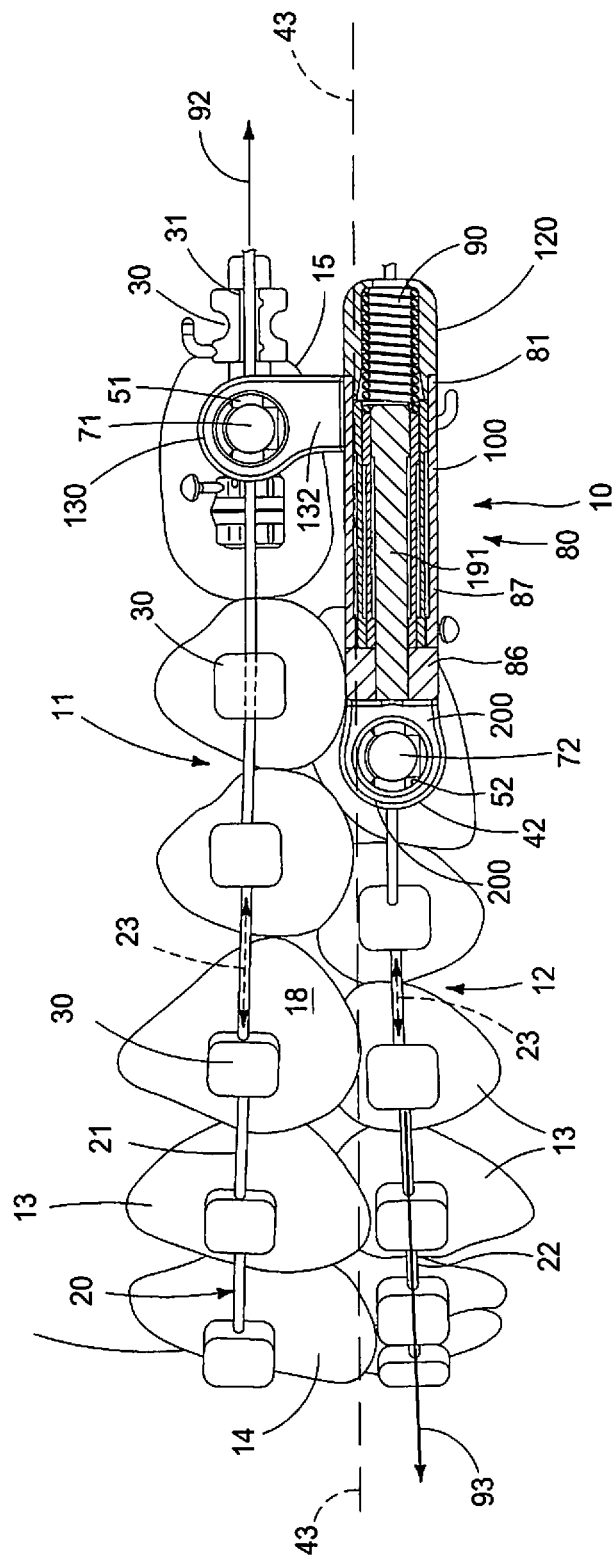
FIG. 2 shows the present invention as illustrated in FIG. 1 in a second, operational position, and the upper and lower dental arches of the patient are illustrated in a closed position.

Referring now to FIGS. 1 and 2, the path of movement of the lower dental arch 12 relative to the upper dental arch 11 is indicated by the numeral 40. The orthodontic appliance 10 of the present invention is operable to cooperate with, or effect the movement of, the upper and lower dental arches 11 and 12, one relative to the other, during the path of movement 40. In this regard it should be understood that the lower dental arch 12 can be located in an open position 41 (FIG. 1) which is spaced from, and in a nonparallel orientation relative to, the upper dental arch 11. Further, the lower dental arch 12 can be moved along the path of travel 40, by the patient, to a closed position, and which is generally indicated by the numeral 42 (FIG. 2). In the closed position 42, the lower dental arch 12 is oriented in substantially parallel relation to the upper dental arch 11. The upper and lower dental arches 11 and 12, respectively, define an occlusal plane 43 when the upper and lower dental arches 11 and 12 are in the closed position 42.

The orthodontic appliance 10 of the present invention is typically installed, and rendered operable in the mouth of a patient, after the initiation of orthodontic treatment, by way of the orthodontic brackets 30, and the first and second archwires 21 and 22 have been installed on the upper and lower dental arches 11 and 12, respectively. Still further, as will be discussed in more detail later in this patent application, and which concerns the method of utilizing the present orthodontic appliance 10, the present orthodontic appliance 10 is typically removed from the mouth of the patient prior to the completion of the orthodontic treatment regimen which is being applied by way of the orthodontic brackets 30, and first and second archwires 21 and 22, respectively. More specifically, and when utilizing the present orthodontic appliance a clinician will typically install the appliance 10 within the mouth of the patient after achieving a general alignment of the teeth 13 in each of the dental arches 11, and 12. At this point in the treatment the clinician will typically remove the first installed archwires 20, and then replace them with a 0.019 inch×0.025 inch stainless steel archwire 21, on the upper dental arch 11; and a 0.016 inch×0.025 inch stainless steel archwire 22 along the lower dental arch 12. Of course archwires 20 having other cross-sectional dimensions, and material characteristics can be utilized by a clinician based upon their professional judgement and needs of the patient undergoing treatment.

Figure 3:
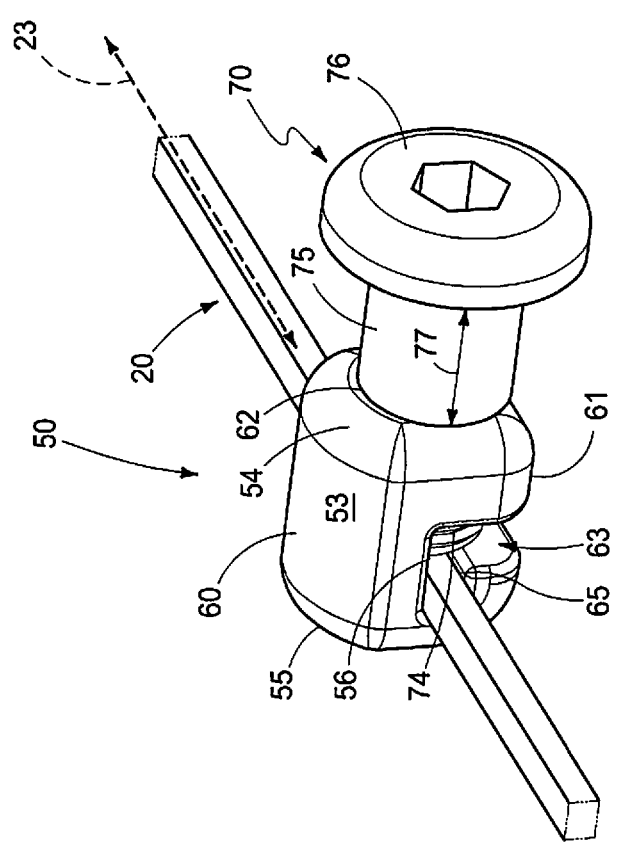
FIG. 3 is an enlarged, partial, perspective view of an archwire coupler which forms a feature of the present invention.
Figure 4:
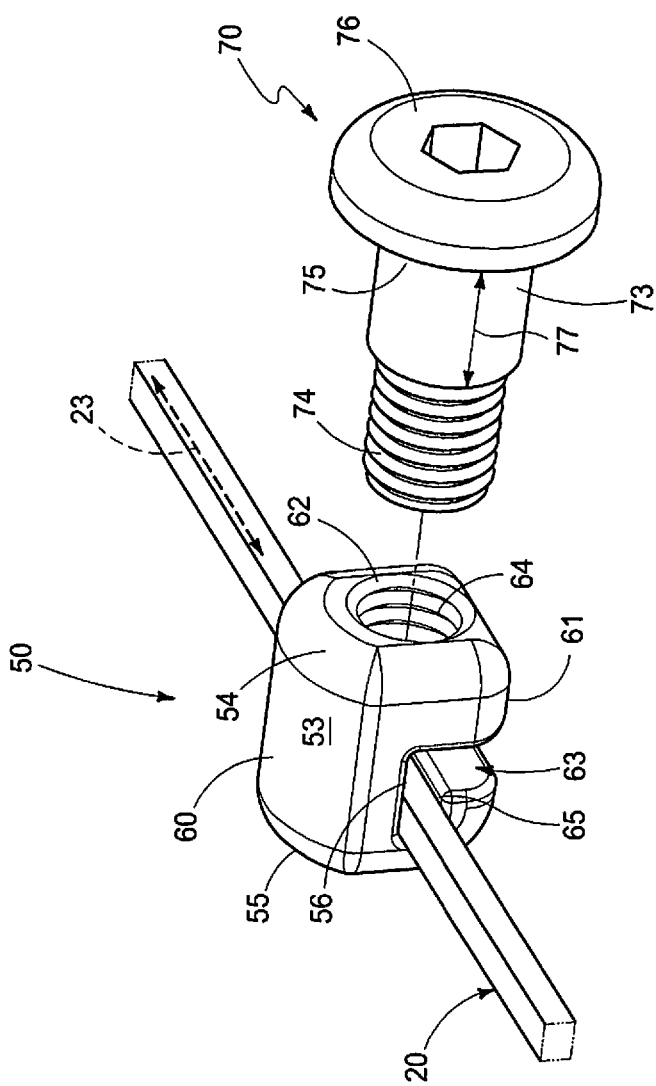
FIG. 4 is an enlarged, exploded, partial, perspective view of the archwire coupler as seen in FIG. 3.
Figure 6:
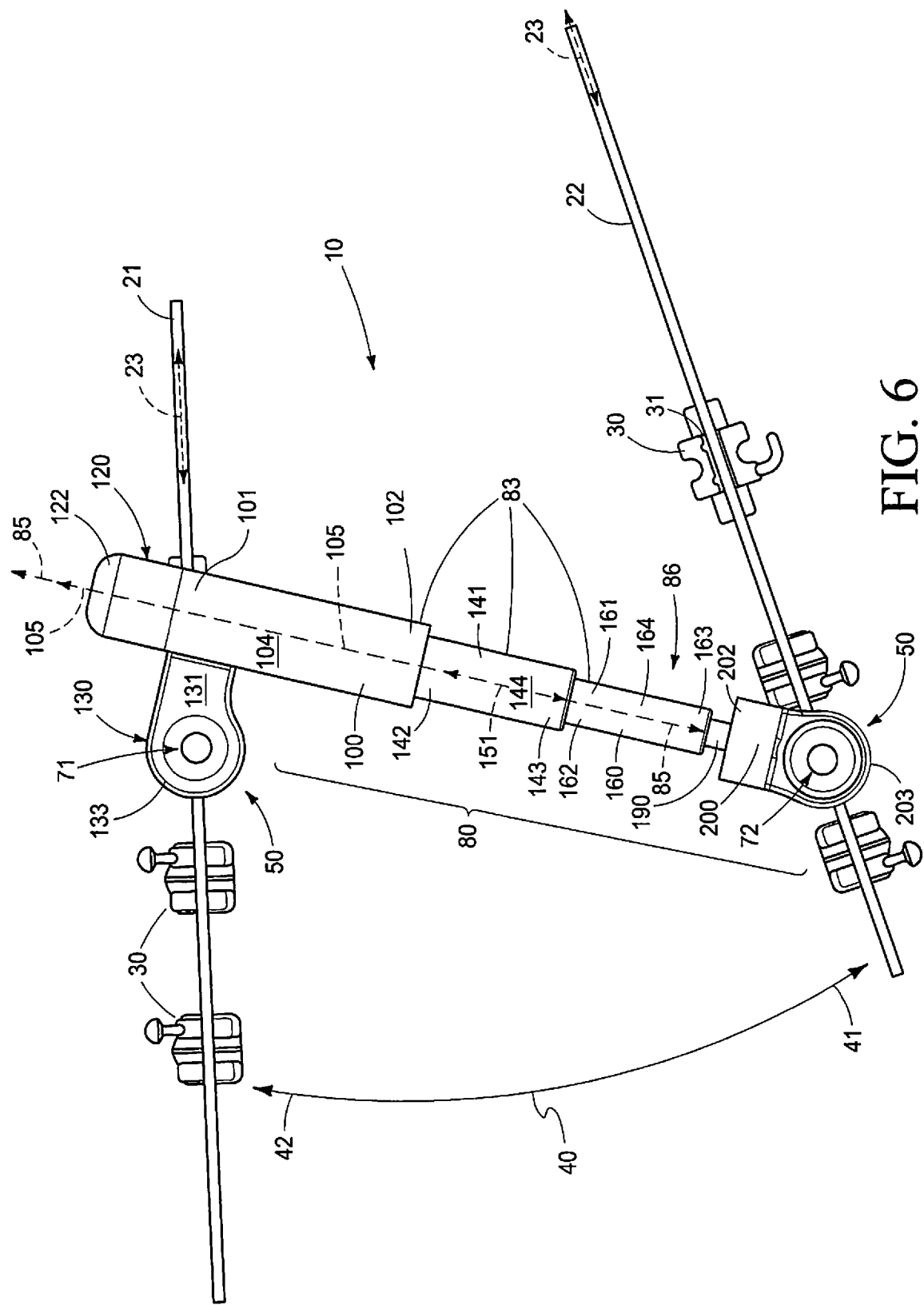
FIG. 6 is a partial, side elevation view of the present invention and which is shown in a first position cooperating with two archwires, and wherein the underlying teeth forming the respective dental arches of the patient are removed so as to allow a better understanding of the invention.

Referring now to FIGS. 3 and 4, the present orthodontic appliance 10 is releasably and rotatably coupled to the first and second archwires 21 and 22 by way of individual archwire couplers 50. The archwire couplers include a first archwire coupler 51, which is releasably affixed to the first archwire 21, and a second archwire coupler which is generally indicated by the numeral 52, and which is further positioned along the second archwire 22 (FIG. 6). The first and second archwire couplers 51 and 52 each have a main body 53 (FIG. 13) which has opposite first and second ends 54 and 55, respectively, and which further defines an internal cavity which is generally indicated by the numeral 56. The main body further has an outside and upwardly facing surface 60, and an outside and downwardly facing surface 61. As seen in FIGS. 3 and 4, a first passageway 62 is formed in the main body 53, and extends generally longitudinally, inwardly from the first end 54 until it connects or communicates with the internal cavity 56. Still further, a second passageway 63 is located between the first and second ends 54 and 55, and further extends transversely, inwardly, from the outside downwardly facing surface 61, and communicates with the internal cavity 56 which is defined by the main body 53. The second passageway 63 which extends from the bottom, outside facing surface 61 is sized so as to allow for the passing or movement of the first or second archwire 21 or 22 therethrough, such that the individual archwires may be received within the internal cavity 56 of one of the archwire couplers 50. This passing or movement of the first and second archwire through the second passageway 63 can be achieved without the removal of the first and second archwire 21 and 22 from the adjacent orthodontic brackets 30 after the initiation of an orthodontic treatment regimen. The internal cavity 56 and the second passageway 63 can be sized so as to accommodate the different cross-sectionally sized archwires, 21 and 22, as was disclosed in the paragraph immediately, above. This novel feature of providing uniquely sized archwire couplers 50 to matingly couple to the different cross-sectionally sized archwires 21 and 22 provides many non-obvious benefits which are not available using the prior art teachings. Chief among these benefits is that uniquely sized archwire couplers 50 substantially reduces or eliminates a failure of the orthodontic appliance 10 as might occur when the archwire coupler 50 which is attached to the lower archwire 22 breaks this smaller dimensioned archwire during use of the orthodontic appliance. The elimination of this point of failure, of course, prevents an interruption in the orthodontic treatment regimen, and increases patient comfort. In this form of the invention the first archwire coupler 51 would be fabricated to specifically cooperate with the first archwire 21, and the second archwire coupler 52 would be fabricated to specifically cooperate with the second archwire 22. The first passageway 62, which is formed in the main body 53, is fabricated or formed in a fashion so as to provide screw threads 64 which can matingly and threadably cooperate with fasteners which will be discussed in greater detail, hereinafter (FIG. 4). The second passageway 62 communicates with the internal cavity 56 in a manner so as to define an archwire receiving region 65, and into which the first and second archwires 21 and 22 may be individually received, and thereafter secured by the fastener which will be discussed in greater detail below. It is, of course, possible to fabricate a "universal" archwire coupler 50, and which could be attached to archwires 20 having different cross-sectional dimensions. However, such a "universal" archwire coupler 50 would probably increase the likelihood that a breakage of a smaller cross-sectionally dimensioned archwire might occur during a given orthodontic treatment regimen. As should be understood the archwire receiving region or slot 65 as defined by each archwire coupler 50 has a width dimension which is measured from the lowermost surface which is closest to the second passageway 63, to the opposite, spaced and uppermost surface; and an archwire receiving region or slot depth which is measured from the rearward edge of second passageway 63, and in the direction of the second end 55 of the archwire coupler 50. Exemplary archwire receiving region or slot 65 dimensions for fabricating a "universal" archwire coupler 50 which would effectively attach to a variety of differently sized archwires 21 which could be used on the upper dental arch 11 could have a width dimension of 0.022 inches to about 0.028 inches; and an archwire slot depth dimension of about 0.020 inches to about 0.050 inches. Further exemplary archwire receiving region or slot 65 dimensions for merely fabricating a "universal" archwire coupler 52 which would effectively attach to a variety of differently sized archwires 22, and which further could be used on the lower dental arch 12 could have a width dimension of about 0.16 inches to about 0.22 inches; and an archwire slot depth dimension of about 0.020 inches to about 0.050 inches. Additionally for archwire couplers 50 which are fabricated to closely mate with individual archwires 21 or 22 having, for example, a cross sectional dimension of 0.022 inch×0.025 inch, the archwire receiving region or slot 65 dimensions would have a width of about 0.022 inches to about 0.026 inches, and a depth of about 0.020 inches to about 0.050 inches. Moreover, for archwire couplers 50 which are fabricated to closely mate with archwires 21 or 22, having, for example, a cross sectional dimension of 0.18 inch×0.025 inch, the archwire receiving region or slot 65 dimension would have a width of about 0.018 inches to about 0.022 inches; and a depth of about 0.020 inches to about 0.050 inches.

The individual archwire couplers 50 are secured in an appropriate location relative to the first and second archwires 21 and 22, by individual fasteners which are generally indicated by the numeral 70 (FIG. 4). The fasteners include a first fastener 71 which releasably secures the first archwire coupler 51 onto the first archwire 21; and a second fastener 72 which releasably secures the second archwire coupler 52 onto the second archwire 22 (FIG. 6). The respective fasteners 71 and 72 releasably couple the main body 53 in an appropriate orientation relative to the respective archwires 21 and 22, without removing the archwires from the adjacent orthodontic brackets 30, and after the initiation of a given orthodontic treatment regimen (FIG. 4). The securing of the respective couplers 50 by means of the fasteners 70 is done in a manner so as to inhibit the longitudinal sliding of the respective archwire couplers 51 and 52, along each of the archwires 20 and 21. This securing or tightening substantially prevents the respective couplers 50 from forcibly engaging one of the orthodontic brackets 30, and which are individually, releasably affixed on the anterior facing surface 18 of one of the patient's teeth 13, and which is receiving orthodontic treatment. The respective first and second fasteners 71 and 72 are defined by a first portion 73, which has a given outside diametral dimension, and which is further sized and shaped so as to be received within, and threadably cooperate with, the first passageway 62 of each of the archwire couplers 51 and 52, respectively. The first portion 73 of each of the fasteners 71 and 72, respectively, further has a distal end 74 which forcibly engages the archwire 21 or 22, and which has previously been placed within the internal cavity 56 of the respective archwire couplers 51 and 52. It should be understood that the distal end 74 releasably secures the archwire coupler 50 onto the individual archwires. Each of the fasteners 70 further has a proximal end 75, and which is located longitudinally, outwardly relative to the first end 54 of each of the archwire couplers 50. Additionally, the fasteners 70 each have a second portion 76 which is made integral with the proximal end 75 of the first portion 73, and which further has an outside diametral dimension which is greater than the outside diametral dimension of the first portion 73. Still further it should be understood that a gap 77 is defined between the first end 54 of the main body 53 of each of the archwire couplers 50, and the second portion 76 of each of the fasteners 70. As will be appreciated the respective fasteners 70 have a dual purpose, the first being to secure each of the archwire couplers 50 to the respective archwires 21 and 22; and secondly, to rotatably attach the orthodontic appliance 10 to each of the archwire couplers 50.

The orthodontic appliance 10, in its broadest aspect, defines a multiple section, elongated telescoping assembly which is generally indicated by the numeral 80. The multiple section, elongated, telescoping assembly 80 is defined, at least in part, by opposite proximal and distal ends 81 and 82, respectively (FIGS. 1 and 2). The proximal end 81 is rotatably attached to the first archwire coupler 51 by way of the fastener 71, and which is affixed to the archwire 21. The archwire 21 is further installed or placed on, or along, the upper dental arch 11 of the patient. On the other hand, the distal end 82 of the telescoping assembly 80 is rotatably affixed to the second archwire coupler 52 by means of the second fastener 72, and which further affixes the archwire coupler 52 on the archwire 22. As can be seen in the drawings (FIG. 5A), at least one of the telescoping sections 83 defines an internal cavity 84. The multiple section, elongated, telescoping assembly 80 is movable along a coaxial course of travel 85 from a first, extended position 86 (FIG. 1), and where the respective sections of the telescoping assembly 80 are oriented longitudinally, outwardly, one relative to the others, and the telescoping assembly has a maximum length dimension as measured between the proximal and distal ends 81 and 82, respectively, and is further oriented in a non-parallel orientation relative to the occlusal plane 43. Further, the coaxial course of travel 85 includes a second, retracted position 87 (FIGS. 2 and 9), and wherein in the second retracted position 87 the respective sections 83 forming the multiple section elongated telescoping assembly 80 has a minimum length dimension as measured between the proximal and distal ends 81 and 82 thereof, and is further located in a substantially parallel orientation relative to the occlusal plane 43. In the current embodiment of the invention the maximum length dimension of the present orthodontic appliance is typically less than about 50 mm; and the minimum length dimension is greater than about 15 mm. These small sizes of the orthodontic appliance 10 permits the present invention to be placed further back in the mouth of the patient so that it may not be readily seen by a casual observer. This is highly desirable from a patient's standpoint.

Figure 7:
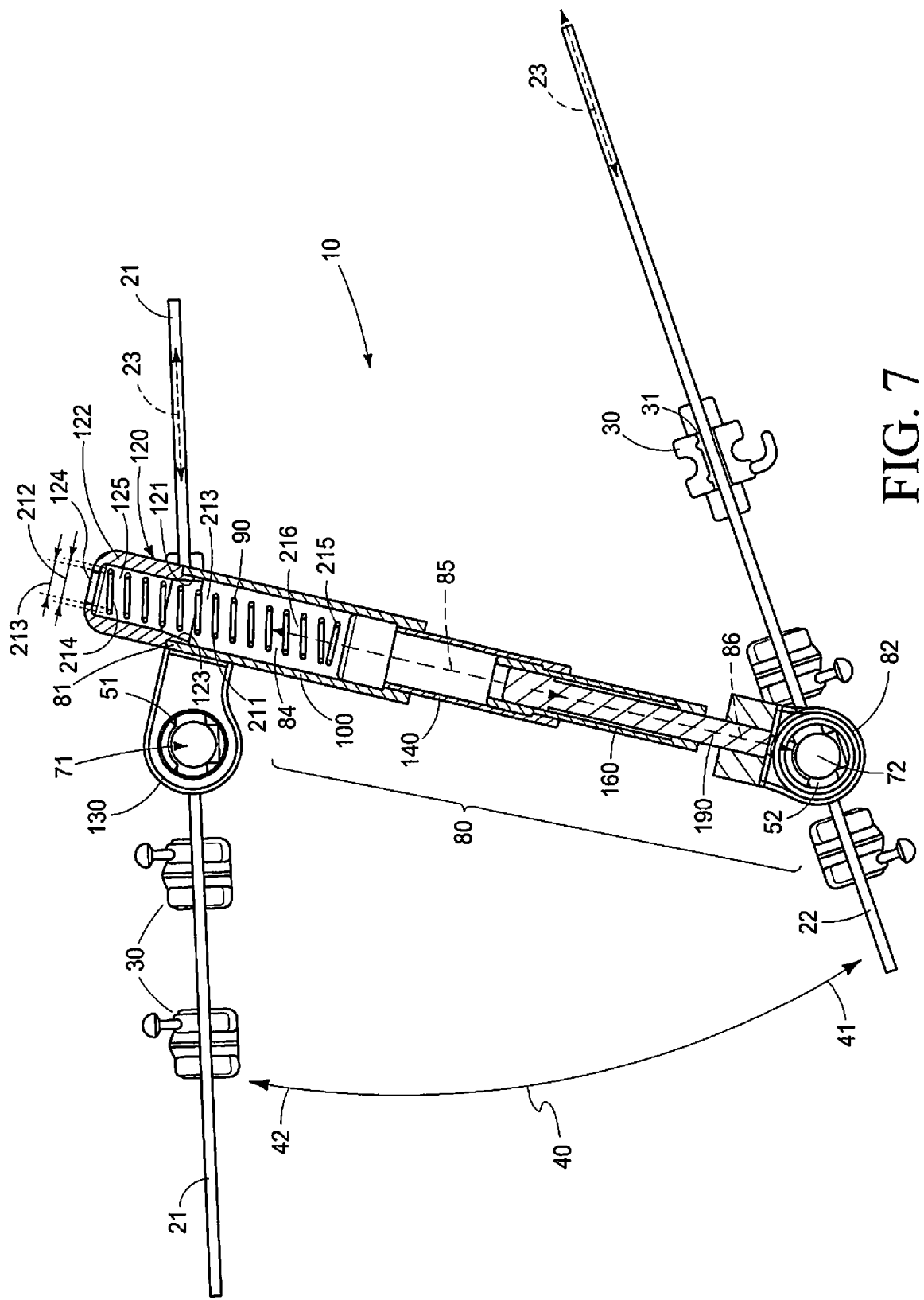
FIG. 7 is a longitudinal, sectional view of the invention as seen in FIG. 6.
Figure 8:
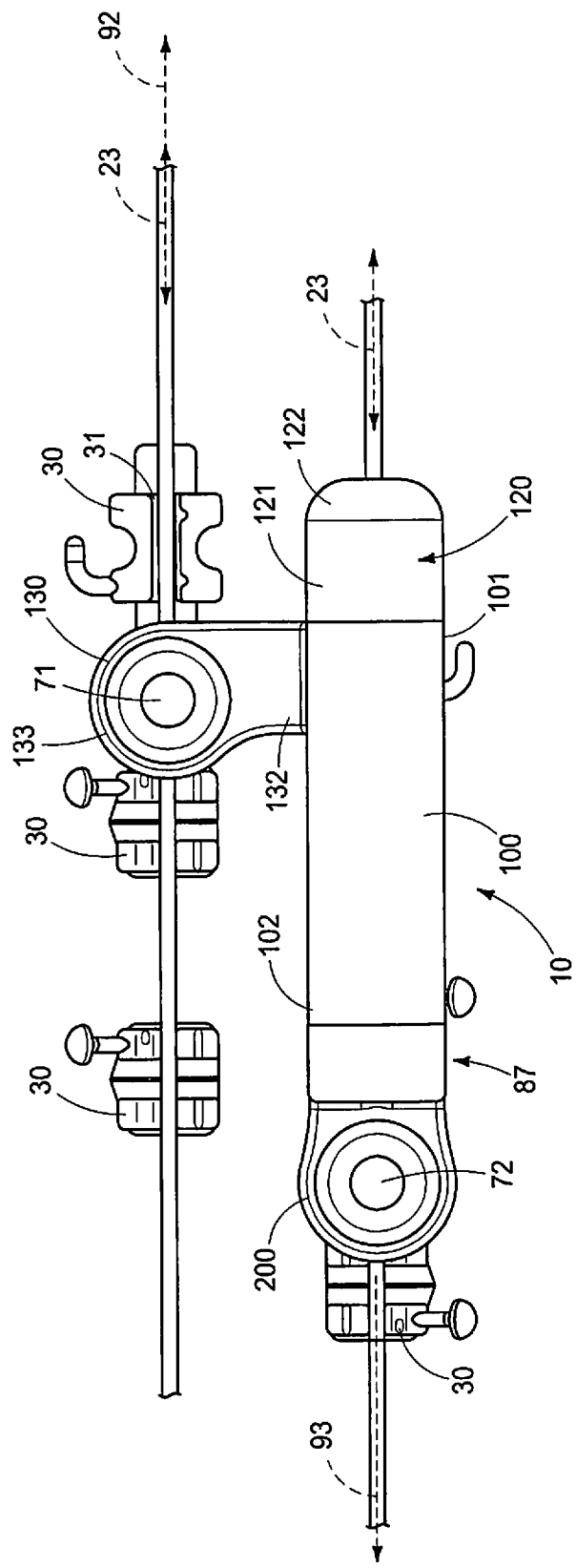
FIG. 8 is side elevation view of the present invention, and which is shown in a second position cooperating with two archwires. Again, the underlying teeth forming the respective dental arches have been removed from this drawing so as to assist in the understanding of the invention.

The orthodontic appliance 10, as described, above, and which includes a multiple section elongated telescoping assembly 80 also has a biasing assembly 90 which is received, at least in part, within the internal cavity 84 of at least one of the telescoping sections 83 of the multiple section elongated telescoping assembly 80 (FIG. 7). The biasing spring exerts a biasing force which is applied to the multiple section elongated telescoping assembly 80 only when the multiple section, elongated telescoping assembly 80 is moving along in the course of travel 85, and is closely adjacent to or at, the second, retracted position 87, and which is located along the course of travel 85 (FIG. 8). In the second, retracted position 87, the biasing force of the biasing spring 90 is transmitted by the respective telescoping sections 83 forming the multiple section elongated telescoping assembly 80 in a direction which is substantially along the longitudinal axis 23 of each of the archwires 21 and 22, respectively, and further along the occlusal plane 43 to simultaneously effect movement of the upper arch 11 of the patient in a rearward direction 92, and the lower arch 12 in a forward direction 93 (FIG. 8) while not simultaneously imparting adverse movement to the respective teeth 13 which form each of the dental arches 11 and 12, respectively, of the patient. This feature, alone, is novel over the teachings of the prior art. As noted earlier, the prior art that has been available to clinicians, for many decades, has substantially prohibited the simultaneous treatment of both maloccluded teeth along a dental arch, and the simultaneous effective movement of the lower jaw to an appropriate orientation so as to correct the Class II overbite of a patient. Furthermore, as noted above, the orientation, as well as the operation of the biasing spring 90 operates substantially exclusively, and only when the upper and lower dental arches 11 and 12, are substantially oriented along the occlusal plane 43, and the multiple section elongated telescoping assembly 80 is substantially parallel to the occlusal plane (FIG. 2). This, again, is quite contrary to the teachings of the prior art where such existing biasing assemblies were usually fully effective and operable to exert a biasing force along the entire path of travel 85 of the telescoping assembly 80. Such a spring arrangement is seen in U.S. Pat. No. 5,829,975 to Gold.

Figure 5:
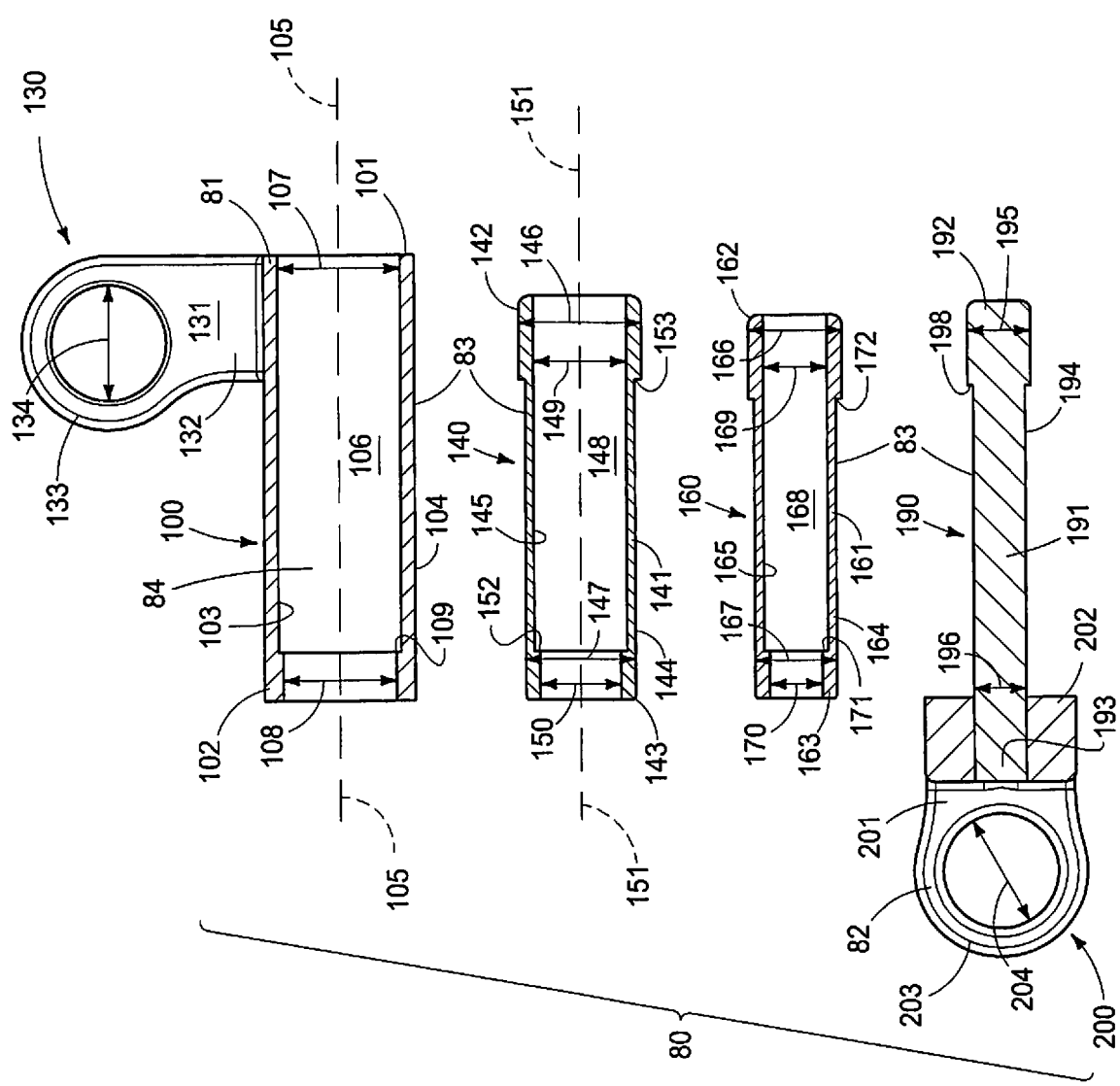
FIG. 5A is a longitudinal sectional view taken through an outer cylindrically shaped tube which forms a feature of the present invention.
FIG. 5B is a longitudinal, sectional view taken through an first intermediate tube and which forms a feature of the present invention.
FIG. 5C is a longitudinal, sectional view taken through a second intermediate tube, and which forms a feature of the present invention.
FIG. 5D is a longitudinal, sectional view taken through an inner elongated rod, and which forms a feature of the present invention.

In the arrangement as seen in the drawings, the multiple section elongated telescoping assembly 80 further comprises an outer, cylindrically shaped tube or section 100 having opposite first and second ends 101 and 102 respectively, and inwardly and outwardly facing surfaces 103 and 104 respectively (FIG. 5A). The outer, cylindrically shaped tube further has a longitudinal axis 105 which extends along its length dimension, and between the first and second ends thereof, 101 and 102 respectively. The inwardly facing surface 103 of the outer cylindrically shaped tube 100 defines an internal cavity 84, 106, and which extends between the first and second ends 101 and 102, and which further constitutes the internal cavity of at least one of the telescoping sections 83, which was discussed, above. The cross-sectional dimension of the internal cavity 106 is non-uniform when measured along its length dimension. In this regard, the inside diametral dimension 107 as measured at the first end 101, is greater than the inside diametral dimension 108, as measured at the second end 102. This reduced diametral dimension at the second end 102 creates an internally oriented flange 109, the use of which will be discussed in greater detail, below. The outer cylindrically shaped tube 100 has a given, and predetermined length dimension.

The present orthodontic appliance 10 includes an end cap (FIG. 10) which is generally indicated by the numeral 120, and which is further operable to releasably cooperate with the first end 101 of the outer, cylindrically shaped tube 100, and selectively occlude the internal cavity 106 which is defined by the inwardly facing surface 103. The end cap has a first end 121 which matingly and releasably couples with, and is received at least in part within, the internal cavity 106 of the outer cylindrically shaped tube 100. The first end 121 of the end cap 120 has an outside diametral dimension which is just slightly less than the inside diametral dimension of the internal cavity 106, as measured at the second end 102, of the outer cylindrically shaped tube 100. The end cap 120 further has a second, end 122, which is located distally outwardly from the first end 121. The first end 121 is defined, in part, by a recessed or reduced dimensioned region 123 which has an outside diametral dimension which is less than the outside diametral dimension of the end cap 120 as measured at the second end 122. Still further it should be noted from the drawings that a small aperture 124 is formed in the second end 122. The small aperture facilitates or permits the removal or expulsion of body fluids or other liquids which might become enclosed within the internal cavity 106 during the use of the orthodontic appliance 10. The end cap defines an internal cavity 125 which is operable to cooperate, at least in part, with the biasing assembly or helically shaped spring 90 as will be discussed in greater detail, hereinafter. The end cap 120 may be selectively secured to the first end 101 of the outer cylindrically shaped tube using conventional fastening techniques such as by adhesive, welding (such as by a laser or other conventional techniques), or conceivably it may be secured by an internal screw thread, not shown. As can be seen from the drawings, the end cap 120 extends longitudinally, outwardly relative to the first end 101 of the outer cylindrically shaped tube 100.

Figure 10:
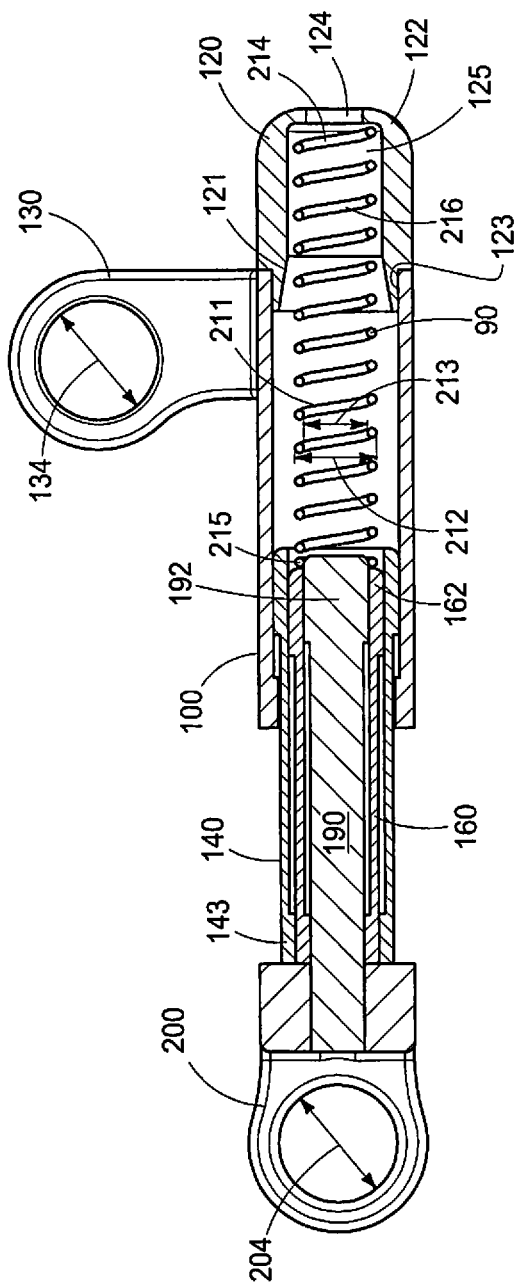
FIG. 10 is longitudinal, sectional view of the present invention, and which shows the invention in an intermediate operational position.

The orthodontic appliance 10 further includes a first attachment member 130 which is defined by a main body 131, and which further has a proximal, or first end 132, and an opposite, distal or second end 133 (FIG. 10). The proximal end 132 is made integral with the outside facing surface 104 of the outer cylindrically shaped tube 100. As seen in the drawings the distal second end 133 is positioned generally laterally outwardly relative to cylindrically shaped tube 100. In the drawings it will be seen that the main body 131 of the first attachment member 130 is generally tangentially oriented relative to the outside facing surface 104 of the outer cylindrically shaped tube 100. Still further, the first attachment member 130 defines an aperture 134 which is formed in the distal, second end 133 of the first attachment member 130, and which is sized so as to allow the distal end 74 of the first portion 73 of fastener 71 to pass therethrough. The first attachment member 130 is oriented or otherwise positioned within the gap 77 that is defined between the first archwire coupler 51, and the second portion 76 of the fastener 71, and further rotates freely about the gap 77. In this regard it should be understood that the aperture 134 has a given diametral or cross-sectional dimension which does not permit the first attachment member 130 to slide over the archwire coupler 51, but further has a diametral dimension which is greater than the outside diametral dimension of the first portion 73 of the fastener 71 (FIG. 7). However, the diametral dimension of the aperture 134 is less than the outside diametral dimension of the second portion 76 of the fastener 70. The increased cross-sectional size of the aperture 134 permits not only the free rotation of the first attachment member 130 about the fastener 71, but further allows some minor lateral side-to-side motion of the lower dental arch 12 relative to the upper dental arch 11 thereby preventing the orthodontic appliance 10 from binding, and inhibiting rotation in the gap 77, or creating discomfort during the opening and closing of the lower dental arch 12 relative to the upper dental arch 11 as might be occasioned during talking, eating and similar patient activities. The first attachment member 130 permits the outside cylindrically shaped tube 100 to also freely rotate about the fastener 71, and which secures the outside cylindrically shaped tube 100, by way of the archwire coupler 51, to the first archwire 21, and which is further positioned along the upper dental arch 11 of the patient.

The multiple-section elongated telescoping assembly 80, and which forms a feature of the orthodontic appliance 10 also includes a first intermediate tube which is generally indicated by the numeral 140, and which further operates as one of the telescoping sections 83. The first intermediate tube 140 is defined, at least in part, by an elongated main body 141 and which further has an opposite first and second end 142 and 143, respectively (FIG. 5B). The elongated main body 141 is further defined, in part, by an outside, and inside facing surface 144 and 145, respectively. The elongated main body 141 of the first intermediate tube 140 is substantially coaxial aligned relative to the longitudinal axis 105 of the outer cylindrically shaped tube 100, and further has a length dimension which is less than the length dimension of the outer cylindrically shaped tube 100. The outside diametral dimension 146 of the first end 142 of the elongated main body 141 is less than the inside diametral dimension 107 of the internal cavity 106 as measured at the first end 105 of the outer cylindrically shaped tube 100. Further, the elongated main body 141 of the first intermediate tube 140 has an outside diametral dimension 147 as measured at the second end 143, thereof, and which is less than the inside diametral dimension 108 of the internal cavity 106 as defined by the outer cylindrically shaped tube 100, and which further is measured at the second end 102 of the outer cylindrically shaped tube 100. The inside facing surface 145 of the first intermediate tube defines an internal cavity 148 which extends between the first and second ends 142, and 143, thereof, and further has an inside diametral dimension 149 when measured at the first end 142, and which is greater than when measured at the second end 143. The inside diametral dimension as measured at the second end 143 is designated by the line labeled 150. The first intermediate tube 140 is telescopingly and reciprocally movable along the given path of travel 85 which is coaxial relative to the longitudinal axis 105 of the outer cylindrically shaped tube 100. The reduced dimensioned inside diametral dimension 150 as measured at the second end 143 of the elongated main body 141 forms an internal flange 152 which forcibly engages the enlarged first end 142 so as to limit the outward, longitudinal movement of the first intermediate tube 140 relative to the second intermediate tube 160 as discussed, below. Further an outwardly directed flange 153 is defined by the first end 142, and is operable to cooperate with the flange 109 that is defined by the outer cylindrically shaped tube 100 so as to limit the outward motion of same.

The orthodontic appliance 10 of the present invention, and which takes the form of the multiple-section elongated telescoping assembly 80 includes a second intermediate tube 160 (FIG. 5C), and which is defined, at least in part, by an elongated main body 161, and which has opposite first, and second ends 162 and 163, respectively, and an outside and inside facing surface 164 and 165, respectively. The elongated main body 161 of the second intermediate tube 160 is coaxially aligned relative to the longitudinal axis 105 of the outer cylindrically tube 100, and is further, at least partially, coaxially rotatable about this same longitudinal axis 105. The second intermediate tube 60 also has a length dimension which is less than about the length dimension of the first intermediate tube 140. The elongated main body 161 has an outside diametral dimension 166 as measured at the first end 162, of the elongated main body 161, and which is less than the inside diametral dimension 149 of the internal cavity 148 as measured at the first end 142 of the first intermediate tube 140. The elongated main body 161 of the second intermediate tube 160 further has an outside diametral dimension 167 as measured at the second end 163, and which is less than the outside diametral dimension of the second end 143 of the first intermediate tube 140. The inside facing surface 165 of the second intermediate tube 160 defines an internal cavity 168 which extends between the first and second ends 162 and 163 thereof. Still further the internal cavity 168 has an inside diametral dimension 169, when measured at the first end 162, and which is greater than when measured at the second end 163. The inside diametral dimension when measured at the second end is indicated by the line labeled 170. The second intermediate tube 160 is telescopingly, reciprocally, and at least partially, coaxially rotatably movable along the given coaxial path of travel 85 relative to both the outer cylindrically shaped tube 100, and the first intermediate tube 140. The reduced inside diametral dimension 170 defines a internal flange region 171, which engages the flange 198 on the first end 192 of the inner elongate rod 190. The engagement of flanges 109 and 153; 152 and 172; and 171 and 198, limits the outward, longitudinal movement of the first and second intermediate tubes 140 and 160, and inner elongated rod 190 relative to the outside cylindrically shaped tube 100.

The orthodontic appliance 10 which takes on the form of the multiple-section elongated telescoping assembly 80 further includes an inner elongated rod 190 which has a main body 191, and which further has opposite first and second ends 192 and 193, respectively, and an outside facing surface 194 (FIG. 5D). The elongated main body 191 of the inner elongated rod is coaxially aligned relative to the longitudinal axis 105 of the outer cylindrically shaped tube 100, and is further coaxially, and at least partially, rotatable about the same longitudinal axis 105. The main body 191 is illustrated as being solid about its length. However, it will be appreciated that the main body could have an internal cavity if desired. Still further, the inner elongated rod 190 further has a length dimension which is greater than about the length dimension of the first intermediate tube 140. The elongated main body 190 of the inner elongated rod 190 has an outside diametral dimension 195, as measured at the first end 192, and which is less than the inside diametral dimension 169 of the internal cavity 168, which is measured at the first end 162 of the second intermediate tube 160. Further, the elongated main body 191 of the inner elongated rod 190 has an outside diametral dimension 196 as measured at the second end 193, and which is less than the inside diametral dimension 170 of the internal cavity 168 of the second intermediate tube 160 and which is measured at the second end 163. This defines a flange 198 which is located at, or near the first end 192. The flange 198 cooperates with the flange 171 to limit the outward movement of the inner elongated rod 190 relative to the second intermediate tube 160. The elongated rod 190 is telescopingly, reciprocally and coaxially longitudinally rotatable about the longitudinal axis 105 of the outer cylindrically shaped tube 100, and is further movable along the path of travel 85 relative to each of the outer cylindrically shaped tube 100, first intermediate tube 140, and second intermediate tube 160, respectively.

The orthodontic appliance 10 of the present invention, and which forms the multiple-section elongated telescoping assembly 80 further includes a second attachment member which is generally indicated by the numeral 200, and which is further defined by a main body 201. The main body 201 has a proximal end 202 which is made integral with the second end 193 of the inner elongated rod 190. The main body 201 also has a second, distal end 203, and which is located longitudinally, outwardly relative to the inner elongated rod 190, and is further positioned along the longitudinal axis 105 which is defined by the outer cylindrically shaped tube 100. Again, the inner elongated rod 190, and the accompanying second attachment member 200 which is made integral with the second end 193, are at least partially coaxially rotatable about the longitudinal axis 105 as defined by the outer cylindrically shaped tube 100. An aperture 204 of an appropriate size is formed in the distal end 203, of the second attachment member 200. The aperture 204 is sized so as to allow the distal end 74 of the first portion 73 of the fastener 72 to pass therethrough. As earlier discussed the second attachment member 200 is received in the gap 77 as defined between the archwire coupler 52, and the second portion 76 of the fastener 72. Still further the second attachment member 200 rotates freely about the gap 77. As earlier discussed the first and second attachment members 130 and 200, respectively are individually affixed to one of the pair of archwires 21 and 22, respectively by way of the respective archwire couplers 51 and 52. The individual cooperating fasteners 71 and 72 matingly engage each of the archwire couplers 51 and 52 so as to secure the respective archwire couplers on each of the archwires 21 and 22, and further provide an attachment point for the proximal and distal ends 81 and 82 of the multiple section elongated telescoping assembly 80. In this arrangement, the multiple section elongated telescoping assembly 80 is thereby appropriately positioned in selective force transmitting relation relative to each of the archwires 21 and 22, respectively. The operation of the telescoping assembly 80 will be discussed in greater detail, below.

As noted earlier, the orthodontic appliance 10 which is defined, in part, by the multiple-section elongated telescoping assembly 80 has a biasing spring here depicted as a helically shaped biasing/compression spring, and which is generally indicated by the numeral 90 (FIG. 7). The helically shaped biasing or compression spring 90 has a generally cylindrically shaped main body 211 (FIG. 10) which has an outside diametral dimension 212, and an inside diametral dimension 213. The helically shaped compression spring 90 has a first end 214, and a second end 215. As should be understood, the inside diametral dimension 213 of the helically shaped biasing or compression spring 90 is greater than the outside diametral dimension 195 as measured at the first end 192 of the inner elongated rod 190. Consequentially, and because of this dimensional relationship, the first end 192 of the elongated rod may pass into the internal cavity 216 which is defined by the inside diametral dimension 213 of the main body 211 (FIG. 10). However it should be recognized that the biasing force of the compression spring 90 is never directly applied to the first end 192, but is transmitted to the first end 162 of the second intermediate tube 160.

Further it should be understood that several different forms of the compression spring 90 could be fabricated. These several forms of the compression spring 90 could vary in length, cross-sectional dimension, and the amount of biasing force exerted. These individual compression springs 90 would be useful in addressing unique patient needs and which have been identified by the treating clinician.

Figure 9:
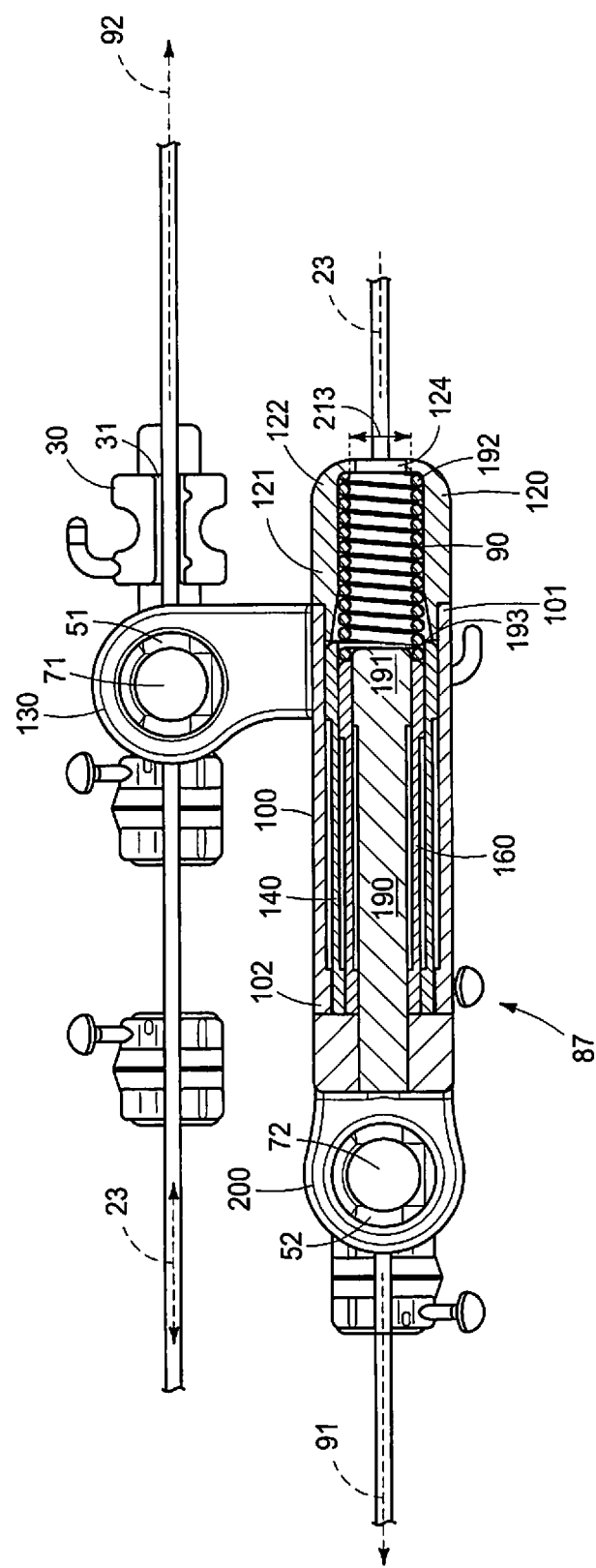
FIG. 9 is a longitudinal, sectional view of the invention as seen in FIG. 8.

As should be understood from the enclosed drawings, the compression spring 90, which is helically shaped, is received, at least in part, within the internal cavity 125 of the end cap 120. The compression spring as noted above has a first end 214 which is received within the internal cavity 125, of the end cap 120, and further has a distal second end 215 which is received in, and is moveable relative to, the internal cavity 106, as defined by the outer cylindrically shaped tube 100. A movement of the lower dental arch 12 from an open position 41, (FIG. 1) and where the lower dental arch 12 of the patient is spaced from the upper dental arch 11, and to a closed position 42, (FIG. 2) and where the lower dental arch 12 is located in a closely adjacent, and substantially, parallel orientation relative to the upper dental arch 11, and along the occlusal plane 143 is effective in imparting force to the inner elongated rod 190 so as to urge the inner elongated rod 190 to move longitudinally, inwardly relative to the second intermediate tube 160. This inwardly directed movement continues until the second attachment member 200 forcibly engages the second end 163 of the second intermediate tube 160. It should be understood that a continued force effected by the closing of the respective dental arches 11 and 12 then causes the movement of the inner elongated rod 190, and the second intermediate tube 160, in unison, longitudinally inwardly, and without any biasing resistance provided by the compression spring 90 relative to the first intermediate tube 140 (FIG. 10). This inward movement continues until the second attachment member 200 forcibly engages the second end 143, of the first intermediate tube 140. A continued force imparted by the closing of the lower dental arch 12 relative to the upper dental arch 11 by the patient then causes the first end 162 of the second intermediate tube 160 to forcibly engage the second end 215 of the compression spring 90 (FIG. 10). The compression spring 90 then biasingly resists continued longitudinally, inward motion of the second intermediate tube 160, and the inner elongated rod 190 by solely applying force to the first end 162. The biasing force exerted by the compression spring 90 is not imparted to the first end 192 of the elongated rod 190, but rather it is directed to second attachment member 200, and which is affixed to the second end 193 of the elongated rod 190. As should be appreciated from the drawings, a continued closing of the lower dental arch 12 relative to the upper dental arch 11 effects a longitudinal inward motion of the inner elongated rod 190, second intermediate tube 160, and the first intermediate tube 140 until the second attachment member 200 forcibly engages the second end 102 of the outer, cylindrically shaped tube 100 (FIG. 9). When this point is reached the biasing force exerted by the compression spring 90 is effective in imparting force to the respective archwires 21 and 22, by way of each of the archwire couplers 51 and 52, so as to urge the upper dental arch 11 to move in a rearward direction 92, while simultaneously urging the lower dental arch 12 to move in a forward direction 91 for so long as the patient's dental arches 11 and 12 are substantially closed 42 (FIG. 2), and oriented along the occlusal plane 43. It should be appreciated that upon opening the respective upper and lower dental arches 11 and 12, the compression spring 90 forcibly urges the second intermediate tube 160 longitudinally, outwardly so as to engage the second attachment 200. This continued force causes the inner elongated rod 190 longitudinally, outwardly relative to the outer cylindrically shaped tube 100, and to a longitudinally, outward location where the compression spring 90 no longer exerts a biasing force on the first end 162 of the second intermediate tube 160 (FIG. 10). In the present embodiment the length of movement of the inner elongated rod 190 to a location where the helical biasing spring 90 no longer exerts a biasing force to effect movement is about 5 to about 12 mm. The continued opening of the respective upper and lower dental arches 11, and 12 by the patient is then effective in moving each of the inner elongated rod 190, and the first and second intermediate tubes 140 and 160, respectively, to a predetermined, longitudinally outward position 41 (FIG. 1) relative to the second end 102 of the outer, cylindrically shaped tube 100, without the biasing force delivered by the compression spring 90. As earlier discussed, the path of movement 40 of the lower dental arch 12 relative to the upper dental arch 11 occurs between the open position 41 whereby the lower dental arch 12 is located in a non-parallel relationship relative to the upper dental arch 11, to a closed position 42, and where the lower dental arch 12 is substantially parallel relation relative to the upper dental arch 11 (FIG. 2), and wherein the upper and lower dental arches 11 and 12, respectively, form an occlusal plane 43. This movement is in stark contrast to the prior art teachings such as seen in U.S. Pat. No. 5,829,975 to Gold, or U.S. Pat. No. 3,798,773 to Northcutt. It should be recognized from a study of the enclosed drawings that when the respective dental arches 11 and 12 are in the open position 41 (FIG. 1), the multiple section elongated telescoping assembly 80 has a maximum length dimension, and further when the respective dental arches 11 and 12 are in the closed position 42 (FIG. 2) the multiple section elongated telescoping assembly 80 has a minimal length dimension. In the open position 41, and at the maximum length dimension of the multiple section telescoping assembly 80, the flange 109 which is defined by the outer cylindrically tube 100 is in mating, resting engagement thereagainst the flange 153 which is defined by the first intermediate tube 140. Still further the flange 152 which is defined by the first intermediate tube 140, rests in mating engagement thereagainst the outwardly directed flange 172 which is defined by the second intermediate tube 160. Further, and in the extended position 86, the flange 171 as defined by the second intermediate tube 160, rests in engagement with the flange 198 as defined by the inner elongated rod 190. In this arrangement, it should be understood that the respective multiple section elongated telescoping assembly 80 can be moved from its minimum length dimension, to its maximum length dimension without disengaging or disconnecting from the outer, cylindrically shaped tube 100. Moreover, a preponderance of the motion of the multiple section elongated telescoping assembly 80 between the open or extended position 86, to the closed or retracted position 87 is achieved without a biasing force exerted by the compression spring 90. This novel feature makes the present invention 10 much more comfortable to wear, from a patient's perspective, but still renders it useful in effecting a clinically desired movement of the upper and lower dental arches 11 and 12, while simultaneously permitting ongoing orthodontic treatment of other malpositioned teeth 13 to continue in an uninterrupted fashion. Further, it should be appreciated that when the compression spring 90 is rendering force to the orthodontic appliance 10 the biasing force is being imparted substantially along the longitudinal axis 23 of each of the upper and lower dental archwires 21 and 22 respectively and along the occlusal plane 43.

The present invention 10 also relates to a method for moving a lower dental arch 12 relative to an upper dental arch 11 while simultaneously moving malpositioned teeth 13 relative to each of the upper and lower dental arches 11 and 12, respectively. In this regard the method of the present invention includes a first step of providing a pair of archwires 21 and 22, each having a longitudinal axis 23, and which are individually releasably attached to a multiplicity of teeth 13 forming the lower and upper dental arches 12 and 11 of a patient undergoing treatment. It should be understood that the lower and upper dental arches 12 and 11 form an occlusal plane 43 when the respective dental arches 11 and 12 are closed 42 (FIG. 2). The method includes another step of attaching an archwire coupler 51 and/or 52 to each of the respective archwires 21 and 22 after an initiation of orthodontic treatment, and without detaching the archwires 21 and 22 from the teeth 13 receiving orthodontic treatment. This attachment of the respective archwire couplers 51 and 52 typically takes place after the teeth 13 are generally aligned, and stronger archwires are installed. The size of these archwires were discussed earlier in this application. The method includes another step of providing a multiple section elongated telescoping assembly 80 having opposite proximal and distal ends 81 and 82, and rotatably attaching the first or proximal end 81 of the telescoping assembly 80 to the archwire coupler 51 which is affixed to the archwire 21, and which is installed on the upper dental arch 11 of the patient. The method further includes another step of rotatably affixing the second or distal end 82 of the telescoping assembly 80 to the archwire coupler 52, and which is affixed on the lower dental arch 12 of the patient. It should be understood that at least one of the telescoping section 83, 100 defines an internal cavity 84, 106. The method includes another step of moving the multiple section elongated telescoping assembly 80 along a coaxial course of travel 85 from a first extended position 86, and where the respective sections 83 of the telescoping assembly 80 are oriented longitudinally outwardly one relative to the other 86 (FIG. 1), and the telescoping assembly 80 has a maximum length dimension as measured between the first and second ends 81 and 82, and is further oriented a non-parallel relationship 41 relative to the occlusal plane 43. The multiple section elongated telescoping assembly 80 is further moveable to a second, retracted position 87, (FIG. 2), and wherein in the second retracted position 86 the respective sections 83 forming the telescoping assembly 80 are substantially internally telescoped together and the telescoping assembly 80 has a minimum length dimension as measured between the first and second ends 81 and 82, respectively, and is further located in a substantially parallel orientation 42 relative to the occlusal plane 43. The method of the present invention further includes yet another step of positioning a biasing assembly, here illustrated as a helically or cylindrically shaped biasing or compression spring 90, at least in part, within the internal cavity 84, 106 of at least one of the telescoping sections 83, 100 of the multiple section elongated telescoping assembly 80, and selectively applying a biasing force with the biasing spring 90 to the multiple section elongated telescoping assembly 80 only when the multiple section elongated telescoping assembly 80 is moving along the course of travel 85, and is closely adjacent to or at the second retracted position 87, along the course of travel 85. The biasing force exerted by the biasing spring 90 is then transmitted to the respective telescoping sections 83 forming the multiple section elongated telescoping assembly 80, and in a direction which is substantially along the longitudinal axis 23 of each of the archwires 21 and 22, and further along the occlusal plane 43 so as to simultaneously effect movement of the upper dental arch 11 of the patient in a rearward direction 92, and the lower dental arch 12 in a forward direction 93 while not simultaneously imparting adverse movement to the respective teeth 13 forming each of the dental arches 11 and 12, of the patient (FIG. 2).

The method of the present invention, and more specifically the step of providing the pair of archwires 21 and 22 further comprises a step of securing each of the archwires 21 and 22 to an anterior facing surface 18 (FIG. 1) of the respective teeth 13 forming each of the dental arches 11 and 12 of the patient by way of individual orthodontic brackets 30. The method includes another step of exerting a force by way of the cooperation of the respective archwires 21 and 22 with the individual orthodontic brackets 30, and which effects first, second and/or third order movement of the respective teeth 13 so as to move malpositioned teeth present in each of the dental arches into a proper orientation relative to adjacent teeth. The method includes another step of attaching the orthodontic appliance 10 to each of the archwires 21 and 22 after the movement of the malpositioned teeth is initiated, and the teeth reach general alignment; and then subsequently removing the orthodontic appliance 10 from the respective archwires 21 and 22, and before the movement or orthodontic treatment of a patient's teeth is completed.

The step of attaching an archwire coupler 50 to each of the respective archwires 21 and 22, respectively, includes supplying or providing an archwire coupler 51 and 52, respectively, each having a main body 53, with an opposite first and second end 54, and 55, and which further defines an internal cavity 56. The present step also includes defining or forming a first passageway 62 which extends longitudinally, inwardly from the first end 54 of the main body 53, and further communicates with the internal cavity 56. As will be seen in the drawings, the main body 53 of the respective archwire couplers 51 and 52 further defines a second passageway 63 which is located between the first and second ends 54 and 55, thereof, and which further extends transversely inwardly relative to the main body 53, and communicates with the internal cavity of the archwire coupler 51 and 52 respectively. The method further includes another step of sizing the second passageway 63 so as to permit the archwire 21 and/or 22 to pass therethrough the second passageway 63, and positioning the archwire 21 and 22 within the internal cavity 63, and without removing either of the archwires 21 and/or 22 from the adjacent orthodontic brackets 30. The method further includes another step of providing individual fasteners 71 and 72, respectively, which are each defined, in part, by a first portion 73 having a given outside diametral dimension and which are further individually sized so as to matingly and releasably cooperate with the first passageway 62, and which is defined by each of the archwire coupler 51 and 52, respectively (FIGS. 3 and 4). The first portion 73 of each of the fasteners 71 and 72 has a distal end 74. The method further includes another step of forcibly engaging one of the archwires 21 and 22 within the internal cavity 56 of each of the archwire couplers 50, by utilizing the distal end 74 of one of the fasteners 71 and 72, and which further additionally releasably secures the respective archwire couplers 50 onto each of the archwires 21 and 22 respectively (FIG. 3). As should be understood each of the fasteners 71 and 72 further has a proximal end 75 which is located longitudinally, outwardly relative to the first end 54 of each of the archwire couplers 51 and 52 respectively. Further each of the fasteners 71 and 72 additionally has a second portion 76 which is made integral with the proximal end 75 of the first portion 73, and which further has an outside diametral dimension which is greater than the outside diametral dimension of the first portion. As seen in the drawings a gap 77 is defined between the first end 54 of the main body 53 of each of the respective archwire couplers 51 and 52, and the second portion 76, of each of the fasteners 71 and 72, respectively.

In the present method, the step of providing the multiple section elongated telescoping assembly 80 further comprises a step of providing an outer cylindrically shaped tube 100 having opposite first and second ends 101 and 102 respectively, inwardly and outwardly facing surfaces 103 and 104, and which further defines a longitudinal axis 105, and which further extends between the opposite first and second ends 101 and 102, respectively. In this step the inwardly facing surface 103 of the outer, cylindrically shaped tube 100, defines an internal cavity 106 which extends between the first and second ends 101 and 102 thereof. The method further includes another step of providing a first attachment member 130 which is made integral with the outside facing surface 104 of the outer cylindrically shaped tube 100. The first attachment member has a distal end 133 which is positioned laterally outwardly relative to the cylindrically shaped tube 100. The method further includes a step of forming an aperture 134 of a given size in the distal end 133 of the first attachment member 130. In the step of forming the aperture 134 it should be understood that the aperture 134 is sized so as to allow the distal end 74 of the first portion 73 of one of the fasteners 71 or 72 to pass therethrough. The method further includes another step of orientating the first attachment member 130 within the gap 77 that is defined between the first portion 76 of one of the fasteners 71 and 72, respectively in the main body 53 of the archwire coupler 51, and which is affixed on the upper dental arch 11 of the patient by the fastener 71 so that the first attachment member in the outer cylindrically shaped tube 100 freely rotates about the gap 77.

The method of the present invention includes another step of providing a first intermediate tube 140 which is defined by an elongated main body 141, and which further has opposite first and second ends 142 and 143, respectively, and an outside and inside facing surface 144 and 145, respectively. The inside facing surface 145 of the first intermediate tube 140 defines an internal cavity 148 extending between the first and second ends 142 and 143, thereof. The method includes another step of telescopingly orienting the first intermediate tube 140 within the internal cavity 106 which is defined by the outer cylindrically shaped tube 100. As earlier discussed the first intermediate tube is reciprocally moveable, and at least partially, coaxially longitudinally rotatable relative to the outer cylindrically shaped tube 100.

The method of the present invention includes another step of providing an intermediate tube 160 which is defined by an elongated main body 161, and which further has opposite first and second ends 162 and 163, and an outside and inside facing surface 164 and 165, respectively. The inside facing surface 165 of the second intermediate tube 160 defines an internal cavity 168 which extends between the first and second ends 162 and 163 thereof; and telescopingly orienting the second intermediate tube 160 within the internal cavity 148, and which is defined by the first intermediate tube 140. The second intermediate tube 160 is reciprocally movable, and at least partially, coaxially and longitudinally rotatable relative to the first intermediate tube 140.

The method of the present invention includes another step of providing an inner elongated rod 190 having a main body 191, and which further has opposite first, and second ends 192 and 193, and an outside facing surface 194; and further telescopingly orienting the inner elongated rod 190 within the internal cavity 168 which is defined by the second intermediate tube 160. The inner elongated rod 190 is reciprocally, and at least partially, longitudinally, and coaxially movable relative to the second intermediate tube 160.

The method of the present invention further includes another step of providing a second attachment member 200 which is made integral with the second end 193 of the inner elongated rod 190, and forming an aperture 204 in the second end 203 of the second attachment member which has a given size, and which further allows the distal end 74 of the first portion 73 of the fastener 72 to pass therethrough; and positioning the second attachment member 200 in the gap 77 that is defined between the second portion 76 of the fastener 72, and the main body 53 of the archwire couple 52, and which is further attached on the lower dental arch 12 of the patient so that the second attachment member rotates freely about the gap 77.

In the methodology of the present invention the step of positioning a biasing spring 90 at least in part within the internal cavity 84, 106 of one of the telescoping sections 83, 100 comprises a step of providing a helically shaped biasing or compression spring 90 which has a first end 214 which is positioned or otherwise telescopingly received within the internal cavity 125, and which is defined by the end cap 120, and wherein, the compression spring 90 further has a second end 215, and which is positioned, at least in part within, and is movable relative to, the internal cavity 84, 106. The internal cavity 106 is defined by the outer cylindrically shaped tube 100. The method further comprises another step of moving the lower dental arch 12 from an open position 41 (FIG. 1), and where the lower dental arch 12 is spaced from the upper dental arch 11, to a closed position 42 (FIG. 2), and where the lower dental arch 12 is located in a closely adjacent and nearly parallel orientation relative to the upper dental arch 11, and further oriented along the occlusal plane 43. In the present methodology, the patient, upon initiating movement of the orthodontic appliance 10 from the first position 41, and without the biasing assistance of the helically shaped compression spring 90, the multiple-section longitudinal telescoping assembly 80 moves from the first extended position 86, and along the course of travel 85. During this course of movement 85, the inner elongated rod 190 moves longitudinally inwardly relative to the second intermediate tube 160, and without the biasing resistance of the helically shaped compression spring 90, until the second attachment member 200 forcibly engages the second end 143 of the first intermediate tube 140. Once this event occurs a continued force as caused by the patient to effect the closing of the lower and upper arches 11 and 12, respectively, causes the first end 162 of the second intermediate tube 160 to move inwardly and forcibly engage the second end 215 of the helically shaped compression spring 90 (FIG. 10) which biasingly resists the continued longitudinally inward motion of the second intermediate tube 160, and the elongated rod 190. When the second attachment member 200 forcibly engages the second end 102 of the outer cylindrically shaped tube 100, and the multiple section elongated telescopingly assembly 80 reaches the second retracted position 87, which is along the course of travel 85 (FIG. 9) inwardly directed motion ceases, and the telescoping assembly 80 now is oriented along the occlusal plane 43. The biasing force exerted by the helically shaped compression spring 90 is then effective in imparting a force which is directed substantially along the longitudinal axis 23, of each of the archwires 21 and 22 respectively by way of the respective archwire couplers 51 and 52 so as to urge the upper dental arch 11 to move in a rearward direction 92 while simultaneously urging a lower dental arch 12 to move in a forward direction 91 for so long as the patient's dental arches 11 and 12 are substantially closed and in a substantially parallel relationship and/or oriented along the occlusal plane 43 (FIG. 2). The method of the present invention further includes another step, and wherein the patient upon opening the dental arches 11, and 12, the helically shaped compression spring 90 biasingly urges the second intermediate tube 160 longitudinally outwardly from the second retracted position 87, which is defined along the course of travel 85, so as to engage the second attachment member 200, and then forcibly move the inner elongated rod 190, and second intermediate to be 160, in unison, longitudinally outwardly relative to the outer cylindrically shaped tube 100, and to a longitudinally outward location where the helically shaped compression spring 90 no longer exerts a biasing force on the first end 162 of the second intermediate tube 160 (FIG. 10). It should be understood that the continued opening of the upper and lower dental arches 11 and 12, by the patient, is effective in moving each of the inner elongated rod 190, and first and second intermediate tubes 140 and 160, respectively, to a predetermined longitudinally outward position relative to the second end 102 of the outer cylindrically shaped tube 100, and to the first extended position 86 which is defined along the course of travel 85, and without the biasing force being delivered by the helically shaped compression spring 90 (FIG. 1). As should be understood, the forcible engagement of the respective flanges 109 and 153; 152 and 172; and 171 with 198 allows the multiple sections 83 of the elongated telescoping assembly 80 to achieve its maximum length dimension when it reaches the first extended position 86.

The methodology of the present invention further includes a step of positioning the orthodontic appliance 10 on or between the second bicuspid and first molar in the upper dental arch 11 of the patient receiving orthodontic treatment, and further between the first and second bicuspid in the lower dental arch 12 so that the orthodontic appliance 10 cannot normally be seen by a casual observer once it has been installed within the mouth of a patient. As should be understood, the first end 92 of the inner elongated rod 190 has a predetermined outside diametral dimension, and wherein the step of providing a helically shaped compression spring 90 further includes forming a helically shaped compression spring 90 which has an inside diametral dimension 213 which is greater than the outside diametral dimension 195 of the first end 192 of the inner elongated rod 190. The first end 192 of the inner elongated rod 190 telescopingly passes, at least in part, into the biasing spring 90 when the telescoping assembly 80 is located in the second, retracted position 87 (FIG. 9). As will be recognized, the biasing force of the biasing spring 90 does not directly act upon the first end 192 of the inner elongated rod 190.

Operation

The operation of the described embodiment of the present invention 10 is believed to be readily apparent and is briefly summarized at this point.

In its broadest aspect the present invention relates to an orthodontic appliance 10 which operably cooperates with both the upper and lower dental arches 11 and 12, respectively, of a patient to achieve a predetermined clinical treatment. The orthodontic appliance 10 includes a pair or archwires 21 and 22, each having a longitudinal axis 23, and which further are individually releasably attached to a multiplicity of teeth 13 forming the upper and lower dental arches 11 and 12 of a patient, and wherein the lower and upper dental arches 11 and 12 form an occlusal plane 43 when the respective dental arches are closed 42 (FIG. 2). The present invention 10 also includes an archwire coupler 50 which is individually attached to each of the respective archwires 11, and 12. Still further the present invention 10 includes a multiple section elongated telescoping assembly 80 having opposite proximal and distal ends 81 and 82. The proximal end 81 is rotatably attached to the archwire coupler 51 which is affixed on the archwire 21, and which is installed on the upper dental arch 11 of the patient. The distal end 82 of the telescoping assembly 80 is further rotatably affixed to the archwire coupler 52 which his affixed on the archwire 22, and which is installed on the lower dental arch 12 of the patient. At least one of the telescoping sections 83, 100 defines an internal cavity 84, 106. The multiple section elongated telescoping assembly 80 is movable along a coaxial course of travel 85 from a first, extended position 86, and where the respective sections 83 of the telescoping assembly 80 are oriented longitudinally, outwardly one relative to the other, and the telescoping assembly 80 has a maximum length dimension as measured between the proximal and distal ends 81 and 82, and is further oriented in a non-parallel orientation 41 relative to the occlusal plane 43. The multiple section elongated telescoping assembly 80 is further movable to a second, retracted position 87, and wherein in the second retracted position 87 the respective sections 100, 140, 160 and 190 and which form the telescoping assembly 80 are substantially internally telescoped together, and the telescoping assembly 80 has a minimum length dimension as measured between the proximal and distal ends 81 and 82, and is further located in a substantially parallel orientation relative to the occlusal plane 43. The present invention further includes a biasing spring 90 which is received at least in part within the internal cavity 84, 106 of at least one of the telescoping sections 83, 100 of the multiple section elongated telescoping assembly 80. A biasing force exerted by the spring 90 is applied to the multiple section elongated telescoping assembly 80 only when the multiple section elongated telescoping 80 is moving along the course of travel 85, and is closely adjacent to, or at, the second, retracted position 87 along the course of travel 85. The biasing force of the spring 90 is transmitted by the respective telescoping sections 83 forming the multiple section elongated telescoping assembly 80 in a direction which is substantially along the longitudinal axis 23, of each of the archwires 21 and 22 respectively, and along the occlusal plane 43, to simultaneously effect movement of the upper dental arch 11 of the patient in a rearward direction 92, and the lower arch 12 of the patient in a forward direction 93, while not simultaneous imparting adverse movement to the respective teeth 13 which form each of the dental arches of the patient (FIG. 2).

Therefore it will be seen that the present invention provides many advantages over the prior art devices utilized, heretofore. The present device is easy and quick to install, is small in size, and further does not interfere with ongoing orthodontic treatment being initiated by a clinician. Moreover the orthodontic appliance is installed in a location within the patient's mouth which is sufficiently rearwardly in the oral cavity such that the orthodontic appliance cannot be readily seen by a casual observer; is comfortable to wear;

and is effective in moving the lower dental arch relative to the upper dental arch to achieve superior clinical results in a minimal amount of treatment time.

In compliance with the statute the invention has been described in language more or less specific as to structural and methodological features. It is to be understood however that the invention is not limited to the specific features shown and described since the means herein disclosed comprise preferred forms of putting the invention into effect. The invention is, therefore, claimed in any of its forms or modifications when properly interpreted according to the scope of the appended claims and in accordance with the Doctrine of Equivalents.

We claim:

1. A method for moving a lower dental arch relative to an upper dental arch while simultaneously moving malpositioned teeth relative to each of the upper and lower dental arches, comprising:

providing a pair of archwires each having a longitudinal axis, and which are individually releasably attached to a multiplicity of teeth forming a lower and upper dental arch of a patient, and wherein the lower and upper dental arches form an occlusal plane when the respective dental arches are closed;

providing an archwire coupler and attaching an archwire coupler to each of the respective archwires after an initiation of orthodontic treatment, and without detaching the archwires from the teeth receiving orthodontic treatment;

providing a multiple section, elongated telescoping assembly having opposite first and second ends, and rotatably attaching the first end of the multiple section, elongated telescoping assembly to the archwire coupler which is affixed to the archwire installed on the upper dental arch of the patient, and further rotatably affixing the second end of the multiple section, elongated telescoping assembly to the archwire coupler which is affixed on the lower dental arch of the patient, and wherein at least one telescoping section of the multiple section, elongated telescoping assembly defines an internal cavity;

moving the multiple section, elongated telescoping assembly along a coaxial course of travel from a first, extended position wherein the sections of the multiple section, elongated telescoping assembly are oriented longitudinally, outwardly, one relative to the other, and the multiple section, elongated telescoping assembly has a maximum length dimension as measured between the first end and the second end thereof, and the multiple section, elongated telescoping assembly is further oriented in a non-parallel relationship relative to the occlusal plane, to a second, retracted position wherein, the respective sections of the multiple section, elongated telescoping assembly are substantially, internally telescoped together, and the multiple section, elongated telescoping assembly has a minimum, length dimension as measured between the first end and the second end, and is substantially parallel relative to the occlusal plane; and providing a biasing spring and positioning the biasing spring, at least in part, within the internal cavity of at least one of the telescoping sections of the multiple section, elongated telescoping assembly, and selectively exerting a biasing force with the biasing spring to the multiple section, elongated telescoping assembly only when the multiple section, elongated telescoping assembly is moving along the coaxial course of travel, and is closely adjacent to, or at the second, retracted position, along the coaxial course of travel, and wherein the biasing force exerted by the biasing spring is transmitted by the telescoping sections forming the multiple section, elongated telescoping assembly in a direction which is substantially along the longitudinal axis of each archwire, and along the occlusal plane, so as to simultaneously effect movement of the upper dental arch of the patient in a rearward direction, and the lower dental arch in a forward direction, while not simultaneously imparting adverse movement to the respective teeth forming each of the dental arches of the patient;

securing each of the archwires to an anterior facing surface of the teeth forming each of the dental arches of the patient by way of individual orthodontic brackets, and exerting a force by way of the cooperation of the respective archwires with the individual orthodontic brackets, and which effects first, second and/or third order movement of the respective teeth so as to move malpositioned teeth present in each of the dental arches into a proper orientation relative to adjacent teeth;

attaching the orthodontic appliance to each of the archwires after the movement of the malpositioned teeth is initiated; and removing the orthodontic appliance from the respective archwires before the movement a patient's teeth is completed, and wherein after the initiation of movement of the malpositioned teeth, the method further comprises replacing the pair of archwires after the patient's teeth have become generally aligned and providing a 0.019 inch×0.025 inch stainless steel archwire which is installed along the upper dental arch, and a 0.016 inch×0.025 inch stainless steel archwire which is installed along the lower dental arch, before attaching the orthodontic appliance on the stainless steelarchwires.

2. A method as claimed in claim 1, and wherein each of the archwire couplers has a main body with an opposite first and second end, and which further defines an internal cavity, and wherein a first passageway extends longitudinally inwardly from the first end of the main body and communicates with the internal cavity, and wherein the main body of each archwire coupler further defines a second passageway which is located between the first end and the second end, and which further extends transversely, inwardly relative to the main body, and communicates with the internal cavity of the archwire coupler, and wherein the method further includes a step of sizing the second passageway to permit the archwire to pass therethrough the second passageway, and positioning the archwire within the internal cavity without removing the archwire from the adjacent orthodontic brackets; and the method further includes another step of providing individual fasteners which are each defined, in part, by a first portion, having a given outside diametral dimension, which is sized to cooperate with the first passageway of each archwire coupler, and the first portion of each individual fastener has a distal end; and the method further includes another step of forcibly engaging one of the archwires within the internal cavity of each of the archwire couplers by utilizing the distal end of one of the individual fasteners, which releasably secures one of the archwire couplers onto each archwire, and wherein each of the individual fasteners further has a proximal end which is located longitudinally, outwardly relative to the first end of the respective archwire coupler, and wherein each individual fastener additionally has a second portion which is integral with the proximal end of the first portion, and the second portion has an outside diametral dimension which is greater than the outside diametral dimension of the first portion, and wherein a gap is defined between the first end of the main body of the each of the archwire couplers, and the second portion of each of the individual fasteners.

3. A method as claimed in claim 1, and wherein the step of providing the multiple section, elongated, telescoping assembly further comprises;

providing an outer, cylindrically shaped tube having an inwardly facing surface and an outwardly facing surface and having a first end and a second end, and defining a longitudinal axis which extends between the first end and the second end, and wherein the inwardly facing surface of the outer cylindrically shaped tube defines an internal cavity which extends between the first end and the second end thereof;

providing a first attachment member which is made integral with the outside facing surface of the outer, cylindrically shaped tube, and the first attachment member has a distal second end which is positioned laterally outwardly relative to the cylindrically shaped tube, and forming an aperture of a given size in the distal s end of the first attachment member, and wherein the aperture is sized to allow the distal end of the first portion of one of the individual fasteners to pass therethrough, and wherein the method further includes a step of orienting the first attachment member within a gap that is defined between the second portion of one of the individual fasteners, and the main body of the archwire coupler which is affixed on the upper dental arch of the patient by the individual fastener so that the first attachment member rotates freely about the gap;

providing a first, intermediate tube which is defined by an elongated main body, having opposite first and second ends, an outside facing surface and an inside facing surface and the inside facing surface of the first intermediate tube defines an internal cavity extending between the first end and the second end thereof and telescopingly orienting the first intermediate tube within the internal cavity defined by the outer, cylindrically shaped tube, and wherein the first, intermediate tube is reciprocally moveable relative to the outer cylindrically shaped tube;

providing a second, intermediate tube which is defined by an elongated main body, having opposite first and second ends, an outside facing surface, and an inside facing surface, and the inside facing surface of the second intermediate tube defines an internal cavity extending between the first end and the second end thereof; and telescopingly orienting the second, intermediate tube within the internal cavity defined by the first, intermediate tube, and wherein the second intermediate tube is reciprocally moveable relative to the first, intermediate tube;

providing an inner, elongated rod having a main body, which has a first end and a second end, and an outside facing surface, and telescopingly orienting the inner, elongated rod within the Internal cavity defined by the second, intermediate tube, and wherein the inner, elongated rod is reciprocally moveable relative to the second, intermediate tube; and providing a second attachment member which is made integral with the second end of the inner elongated rod, and forming an aperture in the second end of the second attachment member which has a given size which allows the distal end of the first portion of one of the individual fasteners to pass therethrough, and positioning the second attachment member in a gap that is defined between the second portion of the individual fastener, and the main body of the archwire coupler, and which is affixed on the lower dental arch of the patient, so that the second attachment member rotates freely about the gap.

4. A method as claimed in claim 3, and further comprising:

providing an end cap, and releasably coupling the end cap to the first end of the outer, cylindrically shaped tube, and wherein the end cap defines an internal cavity which communicates with the internal cavity defined by the outer, cylindrically shaped tube.

5. A method as claimed in claim 4, and wherein the step of positioning the biasing spring at least in part within the internal cavity of one of the telescoping sections comprises a step of providing a helically shaped compression spring which has a first end which is positioned within the internal cavity defined by the end cap, and the helically shaped compression spring has a distal second end, which is positioned within, and is moveable relative to, the internal cavity, defined by the outer, cylindrically shaped tube, and wherein the method further comprises another step of moving the lower dental arch from an open position, where the lower dental arch is spaced apart from the upper dental arch, to a closed position, where the lower dental arch is located in closely adjacent orientation relative to the upper dental arch, and along the occlusal plane, and wherein the patient, upon initiating movement of the orthodontic appliance without the biasing of the helically shaped compression spring, from the first extended position, and along the course of travel, the inner elongated rod moves longitudinally, inwardly relative to the second, intermediate tube, without the biasing resistance of the helically shaped compression spring, until the second attachment member engages the second end of the first intermediate tube, and wherein a continued force generated by the patient to effect closing of the lower and upper dental arches causes the first end of the second intermediate tube to engage the second end of the helically shaped compression spring which biasingly resists the continued, longitudinally inward motion of the second intermediate tube, and the inner elongated rod, until the second attachment member engages the second end of the outer cylindrically shaped tube, and reaches the second, retracted position along the coaxial course of travel, and the biasing force exerted by the helically shaped compression spring imparts a force which is directed along the longitudinal axis of each of the archwires, by way of the respective archwire couplers, to urge the upper dental arch to move in a rearward direction, while simultaneously urging the lower dental arch to move in a forward direction for so long as the patient's dental arches are substantially closed; and wherein the method further comprises opening the dental arches, and during the opening of the dental arches, by the patient, the helically shaped compression spring biasingly urges the second, intermediate tube longitudinally, outwardly from the second, retracted position, which is defined along the coaxial course of travel, to engage the second attachment member, and then forcibly move the inner, elongated rod longitudinally outwardly relative to the outer, cylindrically shaped tube, and to a longitudinally outward location where the helically shaped compression spring no longer exerts a biasing force on the first end of the second intermediate tube, and wherein the continued opening of the upper and lower dental arches, by the patient, moves each of the inner elongated rod, the first intermediate tube and the second intermediate tube to a predetermined, longitudinally, outward position relative to the second end of the outer cylindrically shaped tube, to the first extended position which is defined along the coaxial course of travels without the biasing force being delivered by the helically shaped compression spring.

6. A method as claimed in claim 5, and further comprising:

positioning the orthodontic appliance between a second bicuspid and a first molar in the upper dental arch, and between a first and second bicuspid in the lower dental arch so that the orthodontic appliance cannot normally be seen by a casual observer.

7. A method as claimed in claim 6, and wherein the maximum length dimension of the orthodontic appliance is less than 50 millimeters, and the minimum length dimension of the orthodontic appliance is greater than 15 millimeters.

8. A method as claimed in claim 7, and wherein the first end of the inner elongated rod has a predetermined outside diametral dimension, and wherein the step of providing a helically shaped compression spring includes forming the helically shaped compression spring which has an inside diametral dimension which is greater than the outside diametral dimension of the first end of the inner elongated rod, and wherein the first end of the inner elongated rod telescopingly passes into the helically shaped biasing spring when the telescoping assembly is located in the second retracted position, and wherein the biasing force of the helically shaped biasing spring does not directly act upon the first end of the inner elongated rod.

* * * * *

UNITED STATES PATENT AND TRADEMARK OFFICE
CERTIFICATE OF CORRECTION

PATENT NO. : 10,716,646 B2  
APPLICATION NO. : 15/410350  
DATED : July 21, 2020  
INVENTOR(S) : Terry G. Dischinger, William M. Dischinger and Steven O. Luse Page 1 of 1

It is certified that error appears in the above-identified patent and that said Letters Patent is hereby corrected as shown below:

In the Specification

Column 3: Line 64: Insert the word --the-- after the word --of--.

Column 5: Line 63: Delete the word "locate" and insert the word --located--.

Column 7: Line 27: Delete the word "an" and insert the word --the--.

Column 7: Line 43: Insert the word --a-- after the word --is--.

Column 7: Line 50: Insert the word --a-- after the word --is--.

Column 13: Line 20: Delete the "," after the word --second--.

Column 14: Line 30: Delete the word "coaxial" and insert the word --coaxially--.

Column 15: Line 7: Insert the word --shaped-- after the word --cylindrically--.

Column 22: Line 19: Delete the word "couple" and insert the word --coupler--.

Column 24: Line 2: Delete the word "or" and insert the word --of--.

Column 24: Line 18: Delete the word "his" and insert the word --is--.

In the Claims

Column 27: Line 7: Delete the word "the" before the word --each--.

Signed and Sealed this  
Twenty-ninth Day of June, 2021

Drew Hirshfeld  
*Performing the Functions and Duties of the*  
*Under Secretary of Commerce for Intellectual Property and*  
*Director of the United States Patent and Trademark Office*